(12) United States Patent
Deshpande et al.

(10) Patent No.: US 7,430,337 B2
(45) Date of Patent: Sep. 30, 2008

(54) SYSTEM AND METHOD FOR REMOVING RINGING ARTIFACTS

(75) Inventors: Sachin G. Deshpande, Vancouver, WA (US); Hao Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 969 days.

(21) Appl. No.: 10/863,160

(22) Filed: Jun. 7, 2004

(65) Prior Publication Data

US 2005/0147319 A1    Jul. 7, 2005

Related U.S. Application Data

(60) Provisional application No. 60/535,045, filed on Jan. 6, 2004.

(51) Int. Cl.
G06K 9/40 (2006.01)
H04N 5/00 (2006.01)

(52) U.S. Cl. .................. 382/275; 382/261; 348/607

(58) Field of Classification Search .......... 382/275, 382/274, 268, 266, 254, 261; 348/606, 607, 348/624, 625, 628, 630
See application file for complete search history.

(56) References Cited

U.S. PATENT DOCUMENTS

| 5,367,385 | A | * | 11/1994 | Yuan | 358/465 |
| 5,802,218 | A | | 9/1998 | Brailean | 382/275 |
| 5,850,294 | A | | 12/1998 | Apostolopoulos et al. | 358/433 |
| 5,852,475 | A | | 12/1998 | Gupta et al. | 348/606 |
| 6,226,050 | B1 | * | 5/2001 | Lee | 348/607 |
| 6,236,763 | B1 | | 5/2001 | Wong et al. | 382/261 |
| 6,360,024 | B1 | | 3/2002 | Tan et al. | 382/260 |
| 6,539,060 | B1 | | 3/2003 | Lee et al. | 375/240.29 |
| 7,003,173 | B2 | * | 2/2006 | Deshpande | 382/261 |
| 7,027,654 | B1 | * | 4/2006 | Ameres et al. | 382/236 |

(Continued)

FOREIGN PATENT DOCUMENTS

GB    2373661    9/2002

(Continued)

OTHER PUBLICATIONS

T. Jarske et al., Post-Filtering Methods For Reducing Blocking Effects From Coded Image, IEEE Transactions on Consumer Electronics, vol. 40, No. 3, Aug. 1994 pp. 521-526.

*Primary Examiner*—Yon Couso
(74) *Attorney, Agent, or Firm*—David C. Ripma

(57) ABSTRACT

Ringing artifacts are removed from a quantized image by an image de-ringing filter that includes a determination unit, an adaptive filter and a nonlinear low-pass filter. The determination unit determines whether each selected pixel of a first set of selected pixels of an image contains a ringing artifact based on, for example, gray-level values of selected pixels within a determination kernel of pixels relating to the selected pixel. The adaptive filter generates a filtered gray-level value for each pixel determined by the determination unit to contain a ringing artifact based on, for example, gray-level values of selected pixels within a filtering kernel of pixels relating to the pixel. The nonlinear low-pass filter generates a low-pass-filtered gray-level value for each selected pixel of a second set of selected pixels of the image.

74 Claims, 14 Drawing Sheets

U.S. PATENT DOCUMENTS

| | | | |
|---|---|---|---|
| 2002/0080882 A1 | 6/2002 | Kitagawa | 375/240.29 |
| 2002/0118399 A1 | 8/2002 | Estevez | 358/426.07 |
| 2003/0020835 A1 | 1/2003 | Petrescu | 348/625 |
| 2003/0053711 A1 | 3/2003 | Kim | 382/268 |
| 2004/0184669 A1 * | 9/2004 | Tan et al. | 382/268 |

FOREIGN PATENT DOCUMENTS

| | | |
|---|---|---|
| JP | 4321391 | 11/1992 |

* cited by examiner

| A 201 B | A 202 B | A 203 B |
|---|---|---|
| A 204 B | 200 | A 205 B |
| A 206 B | A 207 B | A 208 B |

| P(1,1) | P(1,2) | P(1,3) |
|---|---|---|
| P(2,1) | P(2,2)<br>P(x,y) | P(2,3) |
| P(3,1) | P(3,2) | P(3,3) |

FIG. 4

| P(1,1) | P(1,2) | P(1,3) |
| --- | --- | --- |
| P(2,1) | P(2,2) P(x,y) | P(2,3) |
| P(3,1) | P(3,2) | P(3,3) |

SYSTEM AND METHOD FOR REMOVING RINGING ARTIFACTS

CROSS-REFERRENCE TO RELATED APPLICATIONS

The present application claims priority to a provisional patent application entitled, METHODS FOR REMOVING RINGING ARTIFACTS, invented by S. Deshpande et al., Ser. No. 60/535,045, filed Jan. 6, 2004, which is incorporated by reference herein.

BACKGROUND OF THE INVENTION

1. Field of the Invention

The present invention relates to compressed image and video coding. In particular, the present invention relates to a system and a method for filtering ringing artifacts that may occur as a result of compressed image and video encoding/decoding processes.

2. Description of the Related Art

Encoding images and video information at a low bit rate saves computation resources and bandwidth. Low bit-rate encoding, however, may cause several types of artifacts in decompressed images, the most notable of which include blocking and ringing artifacts. Ringing artifacts are typically observed around the true edges of an image and are commonly referred to as mosquito artifacts because they tend to be annoying, especially in moving images (i.e., video sequences). A variety of de-blocking and de-ringing filters exist for removing the artifacts caused by compression. Some types of conventional de-ringing filters operate in both the transform and pixel domain, while other types of conventional de-ringing filters use quantization information. One drawback of conventional de-ringing filters is that all are computationally intensive. Consequently, conventional de-ringing filters are not suitable for all receiving systems. Further, de-ringing filters may cause unacceptable delays, even when implemented.

Consequently, what is needed is a low-complexity de-ringing filter that is suitable for receiving systems.

SUMMARY OF THE INVENTION

The present invention provides a low-complexity de-ringing filter. Additionally, the present invention provides a low-complexity de-ringing filter that is suitable for receiving systems.

The advantages of the present invention are provided by an image de-ringing filter that includes a determination unit and an adaptive filter. The determination unit determines whether each selected pixel of a first set of selected pixels of an image contains a ringing artifact based on, for example, at least one selected characteristic of selected pixels within a determination kernel of pixels relating to the selected pixel. At least one selected characteristic can include, for example, a gray-level value or a color space value. The adaptive filter generates a filtered value for each pixel determined by the determination unit to contain a ringing artifact based on, for example, at least one selected characteristic of selected pixels within a filtering kernel of pixels relating to the pixel. The filtered value can include, for example, a filtered gray-level value or a filtered color space value. In one embodiment of the present invention, at least one filtered value is used to replace the corresponding value of a pixel being filtered. Additionally or alternatively, at least one filtered value that has been generated is stored.

The determination kernel could be, for example, an n×n array of pixels containing the selected pixel. Alternatively, the determination kernel could be an n×m array of pixels containing the selected pixels, such that n does not equal m. As yet another alternative, the determination kernel could have a non-rectangular shape. As still another alternative, the determination kernel could have a shape that is based on a position of the selected pixel within the image. In one embodiment of the present invention, the selected pixel is located at a center of the determination kernel, and the determination unit determines whether a selected pixel contains a ringing artifact based further on a comparison of at least one selected characteristic of pixels on opposite sides of the determination kernel with respect to the selected pixel. In another embodiment, the determination kernel includes at least one axis that extends through the selected pixel and bisects determination kernel, and the determination unit determines whether a selected pixel contains a ringing artifact based further on a comparison of at least one selected characteristic of pixels on opposite sides of at least one axis bisecting the determination kernel. When at least one axis is a horizontal axis that extends through the selected pixel and bisects the determination kernel, the determination unit determines whether a selected pixel contains a ringing artifact based further on at least one selected characteristic of pixels on opposite sides of the horizontal axis based on a horizontal reflection. When at least one axis is a vertical axis that extends through the selected pixel and bisects the determination kernel, the determination unit determines whether a selected pixel contains a ringing artifact based further on at least one selected characteristic of pixels on opposite sides of the vertical axis based on a vertical reflection. Other exemplary bases for determining whether the selected pixel contains a ringing artifact include an evaluation of a diagonal symmetry, a diagonal reflection, a diagonal reflective symmetry, a −90 degree rotative symmetry, a centro-symmetry, a quadrantal symmetry, a four-fold rotative symmetry and/or an octagonal symmetry all with respect to the determination kernel of at least one selected characteristic of pixels contained in the determination kernel. Yet another exemplary basis for determining whether the selected pixel contains a ringing artifact includes performing a mathematical operation on at least one selected characteristic of selected pixels within the determination kernel by a predetermined matrix, such as generating a dot-product with a predetermined vector, multiplying selected characteristics of selected pixels within the determination kernel by a predetermined matrix and/or comparing a strength value for the selected pixel to a predetermined threshold value to determine whether the selected pixel contains a ringing artifact.

In one exemplary embodiment of the present invention, the filtering kernel is an n×n array of pixels containing the pixel for which a filtered value is generated. Alternatively, the filtering kernel could be an n×m array of pixels containing the pixel for which a filtered value is generated, such that n does not equal m. As yet another alternative, the filtering kernel could have a non-rectangular shape. As still another alternative, the filtering kernel could be equal to the determination kernel. Yet another alternative embodiment provides that the filtering kernel is different from the determination kernel. Still another alternative embodiment provides that the filtering kernel has a shape that is based on a position of the pixel within the image.

In one exemplary embodiment of the present invention, at least one filtered value is based on a value nV that is equal to a sum of selected characteristics of pixels within the filtering kernel determined to contain a ringing artifact excluding the pixel for which the filtered value is being generated and is based on a value nE that is equal to a total number of pixels within the filtering kernel determined to contain a ringing artifact excluding the pixel for which the filtered value is being generated.

The image de-ringing filter according to the present invention also includes a nonlinear low-pass filter that generates a low-pass-filtered value for each selected pixel of a second set of selected pixels of the image. In one exemplary embodiment, the nonlinear low-pass filter includes a low-pass-filter window selector that selects a low-pass-filter window E for each respective selected pixel of the second set of selected pixels of the image, and a value generator that generates the low-pass-filtered value for each respective selected pixel based on, for example, values of each pixel within the low-pass-filter window lE corresponding to the selected pixel. The low-pass-filtered value could be a low-pass-filtered gray-level value and/or a low-pass-filtered color space value. At least one low-pass-filter window E is an n×n array of pixels containing the selected pixel. Alternatively, at least one low-pass-filter window E could be an n×m array of pixels containing the selected pixel, such that n does not equal m. As yet another alternative, the low-pass-filter window E could have a non-rectangular shape. Additionally or alternatively, at least one low-pass-filter window E could have a shape that is based on a position of the selected pixel in the image. At least one selected pixel is located at about a center of the low-pass-filter window E corresponding to the selected pixel. As yet another alternative, the low-pass-filtered value generated for each respective selected pixel could be based on an average selected characteristic of selected pixels within the low-pass-filter window E corresponding to the selected pixel.

In one exemplary embodiment of the present invention, when a difference between a selected characteristic of a pixel within the low-pass-filter window E and the corresponding characteristic of the selected pixel is greater than or equal to a predetermined threshold value, the selected characteristic of the pixel is not used to generate the average value. In another exemplary embodiment, when a difference between a selected characteristic of a pixel within the low-pass-filter window E and the corresponding characteristic of the selected pixel is less than to the predetermined threshold, the selected characteristic of the selected pixel is used to generate the average value; when a difference is greater than or equal to the threshold value, the selected characteristic of the selected pixel is used to generate the average value.

The present invention also provides an image de-ringing filter having a low-pass-filter window selector and a value generator. The low-pass-filter window selector selects a low-pass-filter window E for each respective selected pixel of a first set of selected pixels of an image. The value generator generates a low-pass-filtered value for each respective selected pixel based on at least one selected characteristic of the pixels contained in the low-pass-filter window E corresponding to the selected pixel, such that the selected characteristic of the selected pixel is used to generate the average value when a difference between the selected characteristic of a pixel within the low-pass-filter window E and the corresponding characteristic of the selected pixel is greater than or equal to a predetermined threshold. In an exemplary embodiment, the average value is generated based further on a number of pixels in the low-pass-filter window E.

At least one low-pass-filter window E is an n×n array of pixels containing the selected pixel. Alternatively, at least one low-pass-filter window E could be an n×m array of pixels containing the selected pixel, such that n does not equal m. Additionally or alternatively, at least one low-pass-filter window E could have a shape that is based on a position of the selected pixel in the image. At least one selected pixel is located at about a center of the low-pass-filter window E corresponding to the selected pixel.

The image de-ringing filter also includes a determination unit and an adaptive filter. The determination unit determines whether each selected pixel of a second set of selected pixels of an image contains a ringing artifact based on, for example, at least one selected characteristic of selected pixels within a determination kernel of pixels relating to the selected pixel of the second set of selected pixels. The adaptive filter generates a filtered value for each pixel determined by the determination unit to contain a ringing artifact based on, for example, at least one selected characteristic of selected pixels within a filtering kernel of pixels relating to the pixel.

One exemplary embodiment of the present invention provides a method for removing ringing artifacts from an image in which it is determined whether each selected pixel of a first set of selected pixels of an image contains a ringing artifact based on, for example, at least one selected characteristic of selected pixels within a determination kernel of pixels relating to the selected pixel. A filtered value is then generated for each pixel determined by the determination unit to contain a ringing artifact based on, for example, at least one selected characteristic of selected pixels within a filtering kernel of pixels relating to the pixel. A low-pass-filtered value can then be generated for each selected pixel of a second set of selected pixels of the image. A low-pass-filtered value is generated by selecting a low-pass-filter window E for each respective selected pixel of the second set of selected pixels of the image, and generating the low-pass-filtered value for each respective selected pixel based on the low-pass-filter window E corresponding to the selected pixel based on, for example, an average value of selected pixels within the low-pass-filter window E corresponding to the selected pixel. When a difference between a selected characteristic of a pixel within the low-pass-filter window E and a corresponding characteristic of the selected pixel is less than a predetermined threshold value, the gray-level value of the pixel is used for generating the average gray-level value. When a difference between the selected characteristic of a pixel within the low-pass-filter window E and the corresponding characteristic of the selected pixel is greater than or equal to the predetermined threshold, the corresponding characteristic of the selected pixel is used for generating the average value.

Another exemplary embodiment of the present invention provides a method for removing ringing artifacts from an image in which a low-pass-filter window E is selected for each respective selected pixel of a first set of selected pixels of an image. A low-pass-filtered gray-level value is then generated for each respective selected pixel based on at least one selected characteristic of the pixels contained in the low-pass-filter window E corresponding to the selected pixel. According to the present invention, a selected characteristic of the selected pixel is used to generate the average value when a difference between the selected characteristic of a pixel within the low-pass-filter window E and the corresponding characteristic of the selected pixel is greater than or equal to a predetermined threshold. Additionally, it is determined whether each selected pixel of a second set of selected pixels of an image contains a ringing artifact based on, for example, at least one selected characteristic of selected pixels within a determination kernel of pixels relating to the selected pixel of the second set of selected pixels. A filtered value is generated for each pixel determined to contain a ringing artifact based on, for example, at least one selected characteristic of selected pixels within a filtering kernel of pixels relating to the pixel.

BRIEF DESCRIPTION OF THE DRAWINGS

The present invention is illustrated by way of example and not by limitation in the accompanying figures in which like reference numerals indicate similar elements and in which:

FIG. 2 depicts an exemplary test pixel and an exemplary group of pixels that neighbor the test pixel;

FIG. 4 depicts a plurality of pixels P(1,1)-P(3,3) that include an exemplary test pixel (pixel P(2,2)) and that form an exemplary determination kernel for test pixel P(2,2);

DETAILED DESCRIPTION OF THE PRESENT INVENTION

The present invention provides a low-complexity de-ringing filter that removes ringing artifacts from image information caused by compression. The degree of filtering of de-ringing artifacts is selectively adjustable. The low-complexity de-ringing filter of the present invention can also selectively remove severe coding artifacts when very strong filtering is needed.

Figure 1:
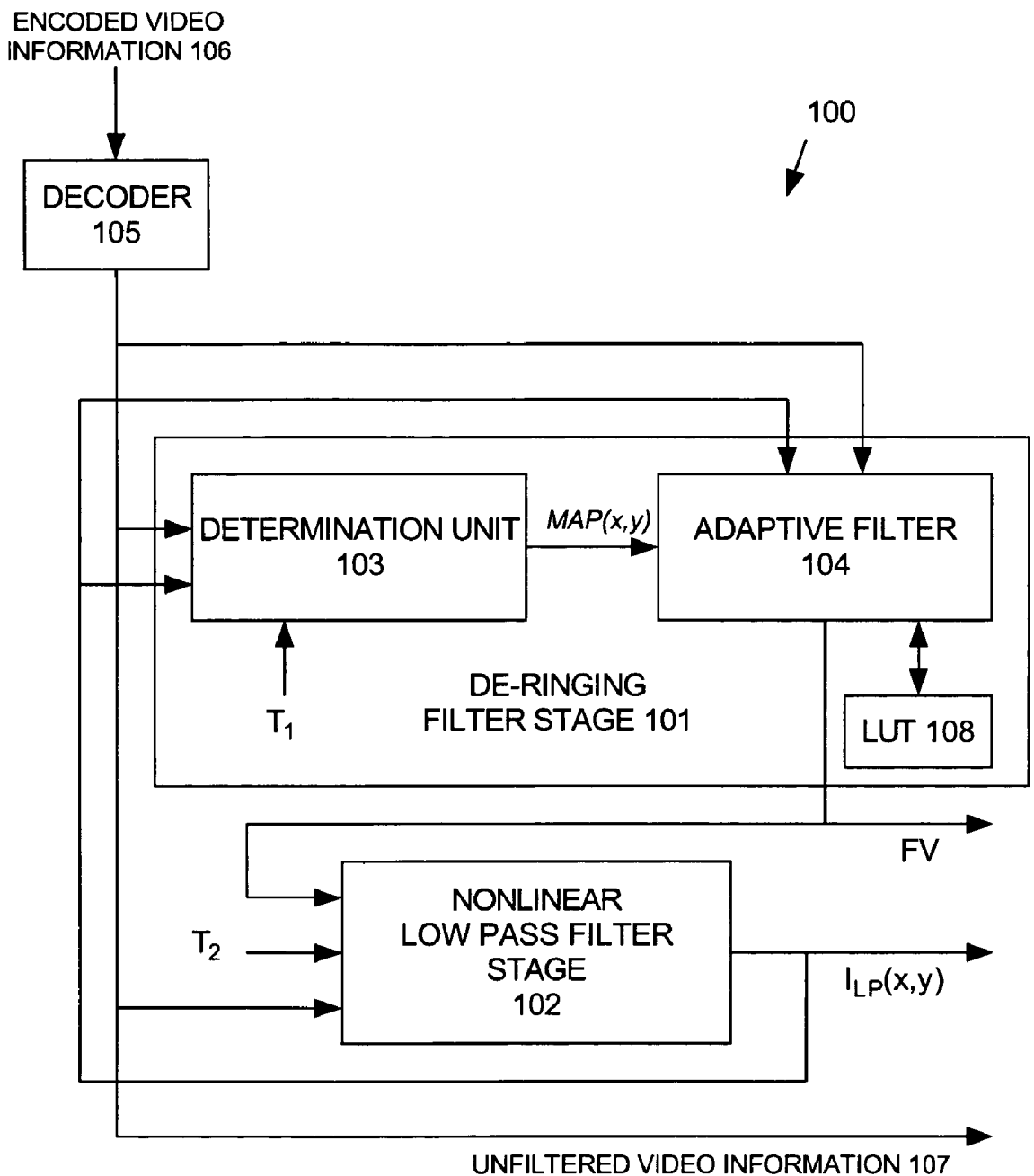
FIG. 1 shows an exemplary functional block diagram of an image de-ringing system according to the present invention.

FIG. 1 shows an exemplary functional block diagram of an image de-ringing system 100 according to the present invention that removes ringing artifacts from image information. Image de-ringing system 100 includes a de-ringing filter stage 101 and a nonlinear low-pass filter (NLPF) stage 102. De-ringing filter stage 101 includes a determination unit 103 and an adaptive filter 104. NLPF stage 102 provides filtering that can be used in conjunction with de-ringing filter stage 101, or can be used alone to enhance the quality of the image information.

A decoder 105 receives encoded video information 106 that is encoded in a standard format, such as Motion Pictures Expert Group (MPEG) MPEG1, MPEG2, MPEG4, H.263, H.263+, H.263++ or H.264 standards, from, for example, a network, local storage or other source, none of which is shown in FIG. 1. Decoder 105 decodes encoded video information 106 in a well-known manner and outputs image information in the form of a plurality of decoded image pixels 107. The decoded image pixels are input to determination unit 103 and adaptive filter 104 of de-ringing filter stage 101. Determination unit 103 determines whether a particular pixel contains ringing artifacts and adaptive filter 104 generates a filtered value (FV) for pixels that contain ringing artifacts. A pixel for which an FV has been generated can be selectively further filtered by NLPF 102 to generate a pixel $I_{LP}(x,y)$ that has additional ringing and blocking artifacts removed. Thus, four levels of filtering are available from the de-ringing filter according to the present invention, no filtering, filtering provided only by de-ringing filter stage 101, filtering provided only by NLPF stage 102 and filtering provided by a cascaded arrangement of de-ringing filter stage 101 and NLPF stage 102.

Determination unit 103 of de-ringing filter stage 101 evaluates each decoded image pixel P(x,y) of an image frame in order to determine whether each pixel contains image-ringing artifacts that should be filtered. As used herein, x and y represent the row and column indices, respectively, of a pixel within an image frame. Alternatively, determination unit could evaluate selected pixels of a frame for image-ringing artifacts.

In order to determine whether a pixel contains image-ringing artifacts, determination unit 103 processes data obtained from a decision kernel relating to the pixel under evaluation, herein referred to as the test pixel. The decision kernel includes a first group of pixels that neighbor the test pixel in the decoded image pixels. When determination unit 103 determines that a test pixel should be filtered, adaptive filter 104 processes a filtering kernel relating to the test pixel to generate a filtered gray-level value (FV) that is used to replace the actual gray-level value of the test pixel. The filtering kernel includes a second group of pixels that neighbor the test pixel.

FIG. 2 depicts an exemplary test pixel 200 and an exemplary group of pixels 201-208 that neighbor test pixel 200. An "A" within a pixel neighboring test pixel 200 is used to designate an exemplary determination kernel that provides information for determining whether test pixel 200 should be filtered. A "B" within a pixel neighboring test pixel 200 is used to designate an exemplary filtering kernel that provides information for a filtered value when test pixel 200 should be filtered. While the determination kernel and the filtering kernel are depicted in FIG. 2 as being identical, it should be understood that the determination kernel and the filtering kernel could differ from each other. Further, while both the determination kernel and the filtering kernel are depicted as three pixel by three pixel (3×3) kernels, it should be understood that the determination kernel and the filtering kernel are each not limited to any particular number of pixels or any particular kernel shape. Further still, while both the determination kernel and the filtering kernel are depicted as including pixels that directly neighbor test pixel 200, it should be understood that the determination kernel and the filtering kernel could include pixels that do not directly neighbor test pixel 200.

Figure 3:
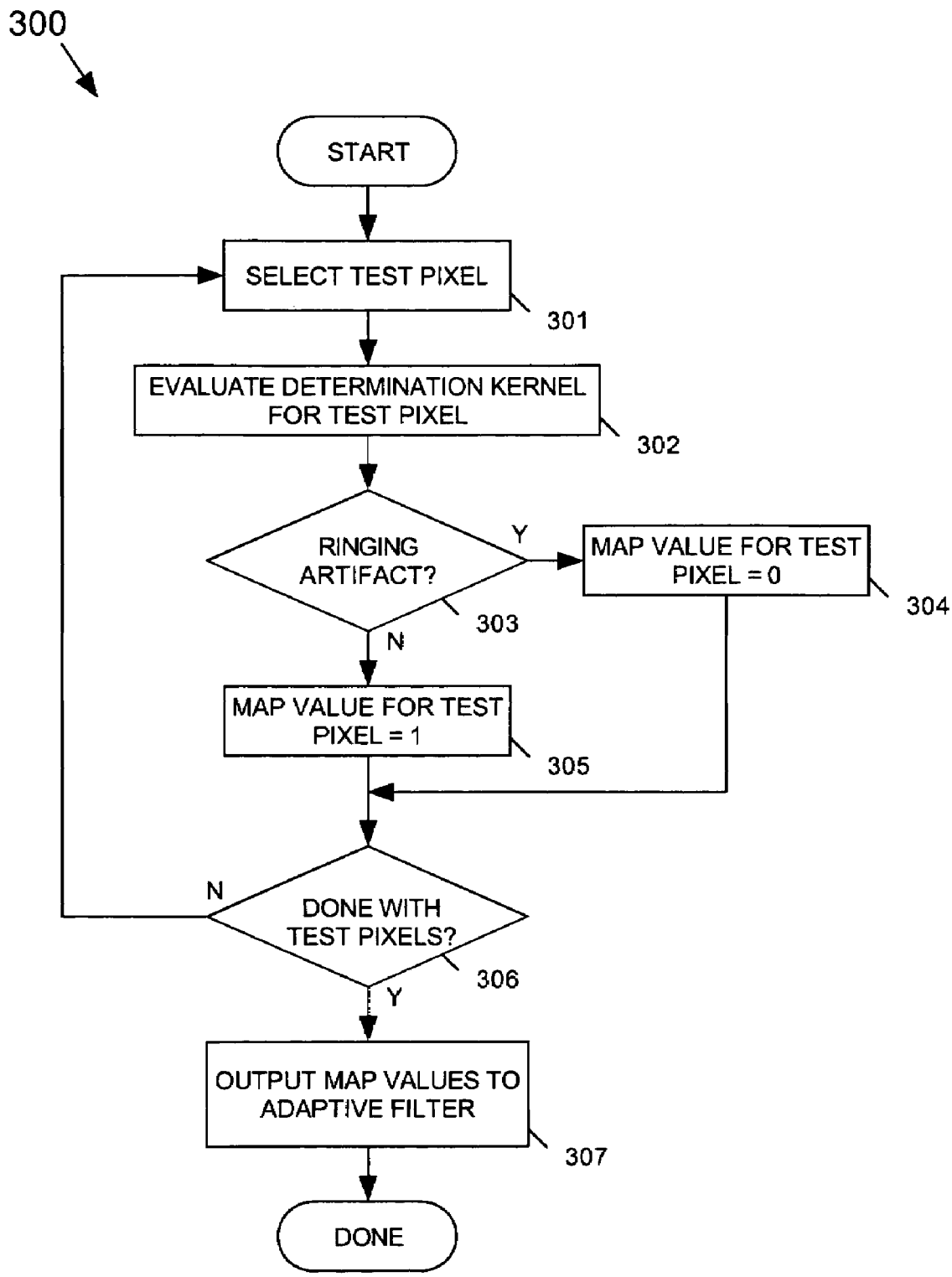
FIG. 3 shows a flow diagram of an exemplary process for determining whether a test pixel contains ringing artifacts according to the present invention.

FIG. 3 shows a flow diagram 300 of an exemplary process according to the present invention for determining whether a test pixel contains ringing artifacts. At step 301, a test pixel in a current frame of pixels is selected. Flow continues to step 302 where the test pixel is evaluated for determining whether it contains ringing artifacts. When determination unit 103 evaluates a test pixel for ringing artifacts, the determination kernel for the test pixel is defined and a mathematical operation is then typically performed on the determination kernel. For example, operators could be defined that are used to form a dot product with the gray-level values of the pixels forming the determination kernel. The dot product is then used for determining whether the test pixel contains ringing artifacts.

Figure 4:
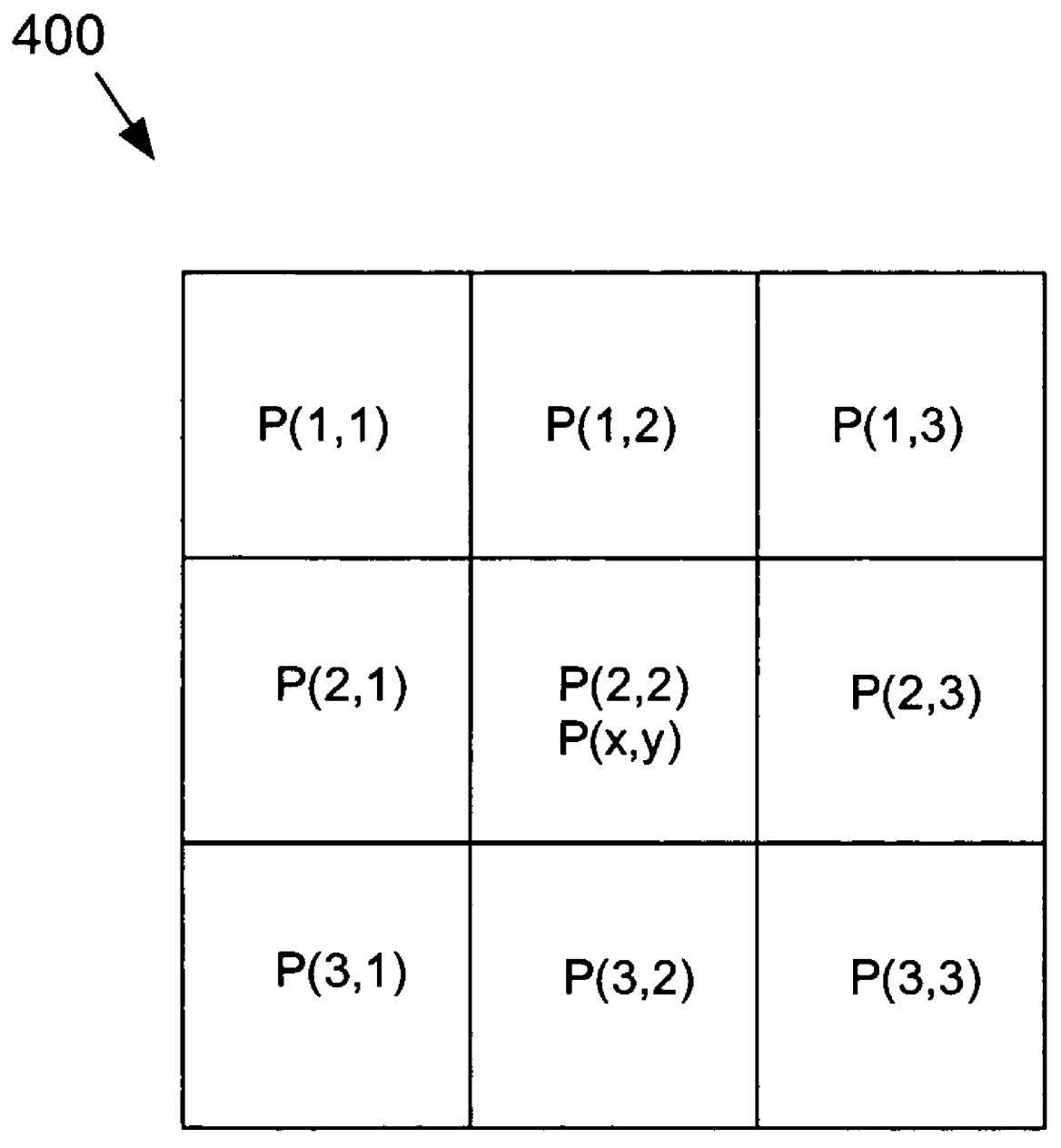

FIG. 4 depicts a plurality of pixels P(1,1) through P(3,3) that includes an exemplary test pixel. As used herein, P represents a gray-level value of a pixel, and i and j represents the row and column indices, respectively, of the pixel within a determination kernel (and also within a filtering kernel). Alternatively, the gray-level value for a pixel may be derived from different color spaces. For example, for an RGB color space, the gray-level value in each R, G and B plane will be separately used for the deringing operation of the present invention. Similarly, for a color space having luminance and chrominance values, e.g., Y, Cb and Cr, can be filtered by processing gray-level values in each plane separately. In FIG. 4, the test pixel is indicated as pixel P(2,2) and as pixel P(x,y) as a reminder that the test pixel can be identified using either set of indices, that is, indices relating to the determination kernel and indices relating to the current frame. Pixels P(1,1) through P(3,3) form an exemplary determination kernel 400 for test pixel P(2,2). Determination kernel 400 could have a different shape with respect to a test pixel depending on, for example, the relative location of the test pixel within a frame and/or a priori knowledge relating to the image information.

For this example, operators H1 and H2 are used for respectively deriving gradient values $g_{H1}(2,2)$ and $g_{H2}(2,2)$. Operators H1 and H2 are defined as $$H1 = [1 \quad 0 \quad -1] \tag{1}$$

and $$H2 = \begin{bmatrix} 1 \\ 0 \\ -1 \end{bmatrix}. \tag{2}$$

Gradient $g_{H1}(2,2)$ is derived by generating the dot product with the gray-level value of the pixels in the row of test pixel P(2,2), i.e., row 2, with operator H1. That is, $$g_{H1}(2,2) = \sum_{j=1}^{3} P(2,j) \times H1(j) = P(2,1) - P(2,3). \tag{3}$$

Gradient $g_{H2}(2,2)$ is similarly derived by generating the dot product with the gray-level value of the pixels in the column of test pixel P(2,2) with operator H2. In particular, $$g_{H2}(2,2) = \sum_{i=1}^{3} P(i,2) \times H2(i) = P(1,2) - P(3,2). \tag{4}$$

Determination unit 103 calculates a strength S(i,j) for the test pixel that is generally defined for this example as $$S(i,j) = (|g_{H1}(i,j)| + |g_{H2}(i,j)| + 1) >> 1 \tag{5}$$

in which ">>1" represents a binary right shift of 1 bit. Thus, for this example, S(i,j) is the summation of the absolute values of the gradients $g_{H1}(i,j)$ and $g_{H2}(i,j)$ plus 1, with the quantity divided by 2 (i.e., a 1-bit binary right shift). The addition of 1 to the sum of the absolute values of the gradients provides rounding to the summation and could optionally be omitted.

For test pixel P(2,2), $$S(2,2) = (|g_{H1}(2,2)| + |g_{H2}(2,2)| + 1) >> 1. \tag{6}$$

Flow continues to step 303 where S(i,j) for test pixel P(i,j) is compared to a threshold $T_1$. The value of threshold $T_1$ value can be selectively varied to change the effective strength of initial de-ringing filter 101. A low value for threshold $T_1$ results in a fewer number of pixels being filtered and, thus, a weaker de-ringing filter. A high value for threshold $T_1$ results in a greater number of pixels being filtered and, thus, a stronger de-ringing filter. A threshold value of between 15 to 20, inclusive, provides excellent de-ringing filtering in most cases.

When, at step 303, $S(i,j) < T_1$, test pixel P(i,j) contains a ringing artifact and will be filtered to remove the ringing artifact. Flow then continues to step 304 where filtering determination unit 103 defines a map value Map(x,y)=0 for test pixel P(i,j). Note that map value Map(x, y) uses indices for test pixel P(i,j) that relate to the position of the test pixel in the current frame. When, at step 303, $S(i,j) \geq T_1$, test pixel P(i,j) does not contain ringing artifacts and will not be filtered. Flow for this situation continues to step 305 where filtering determination unit 103 defines a value Map(x, y)=1 for test pixel P(i,j). It should be understood that the map values indicating a need for filtering and no need for filtering could be alternatively reversed. As each pixel is evaluated for ringing artifacts, filtering determination unit 103 generates a Map(x,y) value corresponding to each pixel P(i,j).

Flow continues to step 306 where it is determined whether all of the pixels of the current frame have been evaluated for ringing artifacts. If not, flow returns to step 301 where the process is repeated for the next pixel. If, at step 306, all of the pixels have been evaluated for ringing artifacts, flow continues to step 307 where the Map(x,y) values are output to adaptive filter 104.

The foregoing illustrative example used the four pixels of the determination kernel that are directly adjacent to test pixel P(i,j) to make a filtering determination. It should be understood that a different quantity of pixels, pixels in different positions in a determination kernel, and/or a different determination kernel size and/or shape could alternatively be used for determining whether a test pixel contains ringing artifacts. For example, a 5×5 determination kernel could be used, in which case the operators H1 and H2 could be defined as $$H1 = [1 \quad 1 \quad 0 \quad -1 \quad -1]; \tag{7}$$

and $$H2 = \begin{bmatrix} 1 \\ 1 \\ 0 \\ -1 \\ -1 \end{bmatrix}. \tag{8}$$

As an alternative evaluation technique, determination unit 103 could define one or more matrices that would be used to multiply the gray-level values of the pixels of a determination kernel in order to determine whether a test pixel contains ringing artifacts. As another alternative evaluation technique, determination unit 103 could define a matrix having a zero value in a position corresponding to the position of a test pixel that would be used to multiply the gray-level values of the pixels of the determination kernel in order to determine whether the test pixel contains ringing artifacts. For still another alternative evaluation technique, a filtering determination could be based on the difference between the gray-level values of pixels on a first side of a coordinate axis and the gray-level value of the pixels on the opposite side of the coordinate axis.

As yet another alternative technique, a filtering determination could be based on a comparison of gray-level values of pixels on opposite sides of a coordinate axis that bisects a test pixel. For example, the gray-level values of pixels P(1,1), P(2,1) and P(3,1) could be respectively compared to the gray-level values of pixels P(1,3), P(2,3) and P(3,3).

In still another alternative technique, the gray-level values of pixels on opposite sides of a plurality of coordinate axes that are oriented in a plurality of directions could be compared to each other. For example, one axis could be the column of determination kernel 300 in FIG. 3 containing pixels P(1,2), P(2,2) and P(3,2) and another axis could be the row of determination kernel 300 containing pixels P(2,1), P(2,2) and P(2,3). The filtering determination could be based on the comparison of the gray-level values of pixels P(1,1) and P(1,3) to gray-level values pixels P(3,1) and P(3,3), respectively, and a comparison of the gray-level values of pixels P(1,1) and P(3,1) to the gray-level values of pixels P(1,3) and P(3,3). Other exemplary coordinate axis comparisons on which a filtering determination could be made include comparisons made based on an x-axis reflection (horizontal axis), a y-axis reflection (vertical axis), a diagonal reflection, a diagonal reflective symmetry, a −90 degree rotative symmetry, a centro-symmetry, a quadrantal symmetry, a diagonal symmetry, a four-fold rotative symmetry, and an octagonal symmetry.

Adaptive filter 104 generates a filtered gray-level value (FV) for each pixel P(x,y) having a corresponding map value Map(x,y)=0 (i.e., containing ringing artifacts) by typically performing a mathematical operation on a filtering kernel that relates to the pixel. Filtering can be done in place or alternatively the results can be stored in a separate memory store for later use. For example, satisfactory results are obtained with an in-place computational approach using a 3×3 kernel.

Figure 5:
FIG. 5 depicts a plurality of pixels P(1,1)-P(3,3) that include an exemplary test pixel (pixel P(2,2)) and that form an exemplary filtering kernel for test pixel P(2,2)

FIG. 5 depicts a plurality of pixels P(1,1)-P(3,3) that include an exemplary test pixel (i.e., pixel P(2,2)) and that form an exemplary filtering kernel 500 for test pixel P(2,2). Filtering kernel 500 corresponds to the exemplary second group of pixels designated in FIG. 2 with a "B". It should be understood that filtering kernel 500 could have a different shape with respect to a test pixel depending on, for example, the relative location of the test pixel within a frame and/or a priori knowledge relating to the image information. Additionally, the test pixel in FIG. 5 is indicated as pixel P(2,2) and as pixel P(x,y) as a reminder that the test pixel can be identified using either set of indices, that is, indices relating to the determination kernel and indices relating to the current frame.

Figure 6:
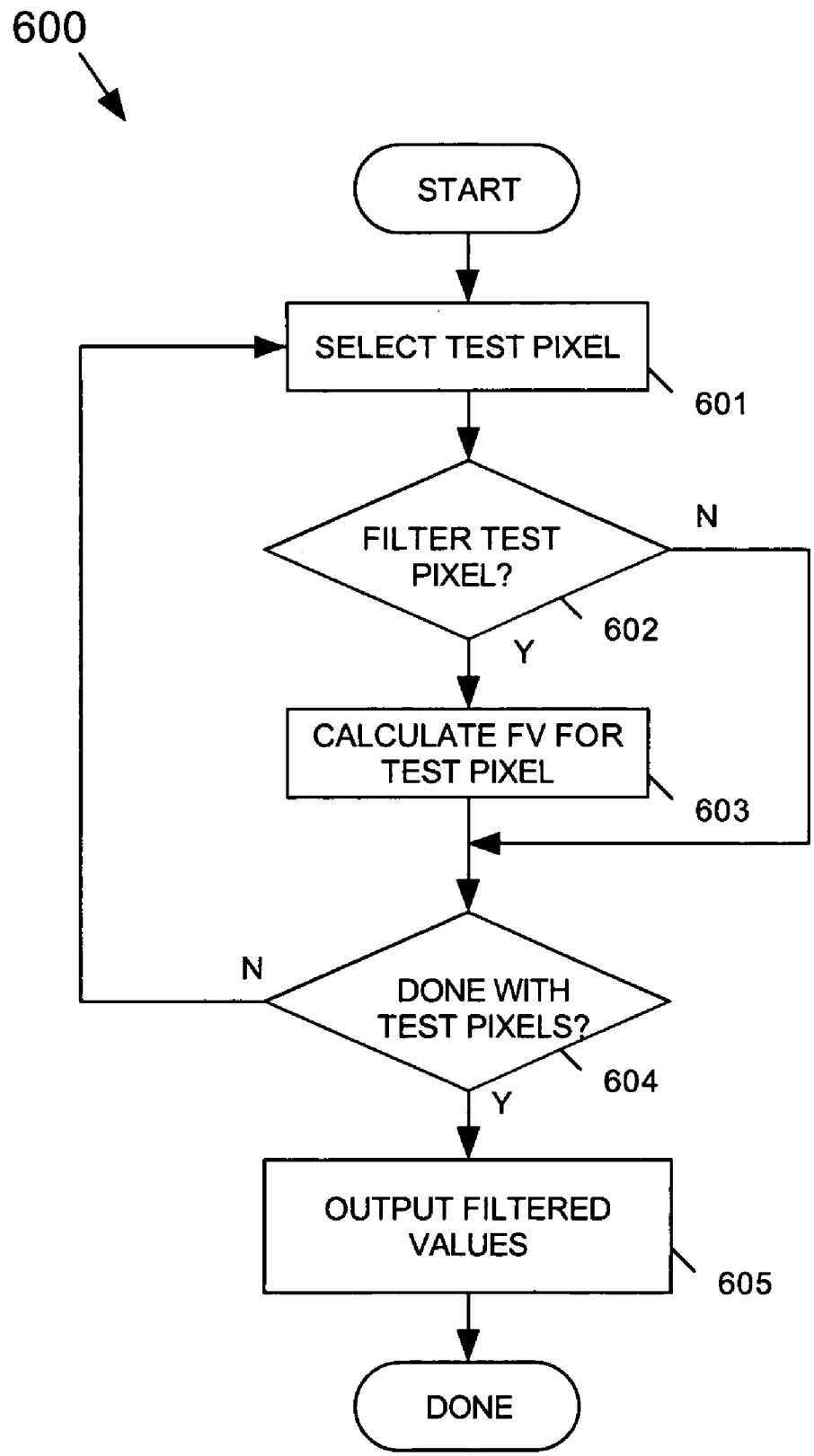
FIG. 6 shows a flow diagram for an exemplary process according to the present invention for generating filtered values for pixels of a current frame.

FIG. 6 shows a flow diagram 600 for an exemplary process according to the present invention of generating filtered values (FVs) for pixels of a current frame. At step 601, a test pixel is selected. Flow continues to step 602 where it is determined whether the test pixel should be filtered. For example, when the map value Map(x,y) for the test pixel equals 0, flow continues to step 603 where a FV is generated for the test pixel. Flow continues to step 604 where it is determined whether all pixels of the current frame have been considered. If not, flow returns to step returns to step 601 where the process continues for the remainder of the pixels for the current frame.

If, at step 602, it is determined that a FV for the test pixel should not be generated, flow continues to step 604.

When all pixels of the current frame have been considered, flow continues to step 605 where the filtered values are output.

Figure 7:
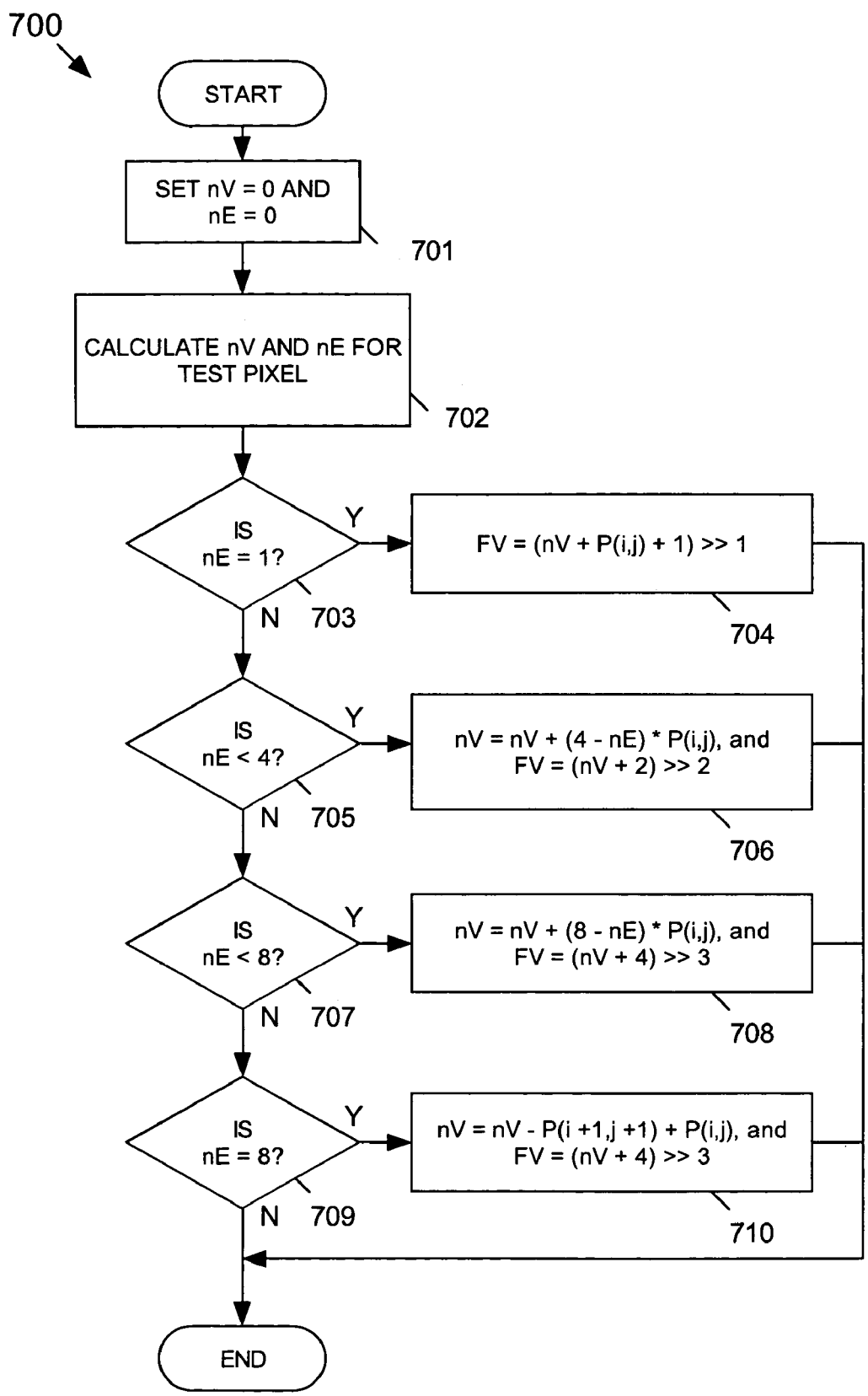
FIG. 7 shows a flow diagram for an exemplary process according to the present invention for generating a filtered value (FV) for a test pixel.

Adaptive filter 104 generates a FV for a test pixel based on two values, nV and nE, which depend on the filtering kernel for the test pixel. Value nV is equal to the sum of gray-level values of pixels in the filtering kernel having corresponding map values that are equal to 0, excluding the test pixel. Value nE is equal to the total number of pixels in the filtering kernel, also excluding the test pixel. FIG. 7 shows a flow diagram 700 for an exemplary process according to the present invention of generating a filtered value (FV) for a test pixel that is suitable for step 603 in FIG. 6. The following description of flow diagram 700 is based on exemplary filtering kernel 500, shown in FIG. 5.

At step 701, values nV and nE are both set to equal 0. At step 702, values nV and nE are generated for the test pixel. Flow continues to step 703 where it is determined whether nE=1. If so, flow continues to step 704 where FV for the test pixel is calculated as $$FV=(nV+P(i,j)+1)>>1, \qquad (9)$$

in which ">>1" represents a binary right-shift operation of 1 bit. The addition of "1" in the calculation for FV provides rounding.

If, at step 703, nE≠1, flow continues to step 705 where it is determined whether 1<nE<4. If so, flow continues to step 706, where FV for the test pixel is calculated as $$nV=nV+(4-nE)*P(i,j) \qquad (10)$$

and $$FV=(nV+2)>>2, \qquad (11)$$

in which ">>2" represents a binary right-shift operation of 2 bits.

If, at step 705, nE>4, flow continues to step 707 where it is determined whether 4≦nE<8. If so, flow continues to step 708 where FV for the test pixel is calculated as $$nV=nV+(8-nE)*P(i,j) \qquad (12)$$

and $$FV=(nV+4)>>3, \qquad (13)$$

in which ">>3" represents a binary right-shift operation of 3 bits.

If, at step 707, nE=8, flow continues to step 709 where it is determined whether nE=8. If so, flow continues to step 710 where FV for the test pixel is calculated as $$nV=nV-P(i+a,j+b)+P(i,j) \qquad (14)$$

and $$FV=(nV+4)>>3, \qquad (15)$$

in which a=−1, 0, +1, b=−1, 0, +1, except a and b cannot equal 0 simultaneously; and ">>3" represents a binary right-shift operation of 3 bits. The values a and b allow any pixel from the 3×3 filtering kernel to be selected for generating FV. When the filtering kernel is a different size and/or shape from a 3×3 kernel, the variables a and b will vary accordingly.

While eight neighboring pixels from the filtering kernel were used to generate the FV for the test pixel in the foregoing example, a different number of filtering kernel pixels could be used and/or a filtering kernel having a different size and shape could be used for generating the FV. Additionally, while the gray-level value of the test pixel was used in the foregoing example, the gray-level value of the test pixel could alternatively be omitted from the calculation of the FV for the test pixel.

Further still, adaptive filter 104 could alternatively generate a FV for a test pixel by calculating nV as the sum of the gray-level values of pixels in the filtering kernel for the test pixel having a corresponding map value that equal to 0, and by calculating nE as the total number pixels in the filtering kernel having a corresponding map value that is equal to 0. The alternative process would be as follows.

When nE =1, then FV for the test pixel would be calculated as $$FV=(nV+P(i,j))>>1. \qquad (16)$$

in which ">>1" represents a binary right-shift operation of 1 bit. The omission of an addition of "1", in contrast to Eq. (9), provides truncation.

Otherwise, when 1<nE<4, FV for the test pixel would be calculated as $$nV=nV+(4-nE)*P(i,j) \qquad (17)$$

and $$FV=(nV)>>2, \qquad (18)$$

in which ">>2" represents a binary right-shift operation of 2 bits.

When 4≦nE<8, FV for the test pixel would be calculated as $$nV=nV+(8-nE)*P(i,j) \qquad (19)$$

and $$FV=(nV)>>3, \qquad (20)$$

in which ">>3" represents a binary right-shift operation of 3 bits.

When nE=8, FV for the test pixel would be calculated as $$nV=nV-P(i+a,j+b)+P(i,j) \qquad (21)$$

and $$FV=(nV)>>3, \qquad (22)$$

in which a=−1, 0, +1, b=−1, 0, +1, except a and b cannot equal 0 simultaneously; and ">>3" represents a binary right-shift operation of 3 bits. As before, the values a and b allow any pixel from the 3×3 filtering kernel to be selected for generating FV. When the filtering kernel is a different size and/or shape from a 3×3 kernel, the variables a and b will vary accordingly.

As yet another alternative embodiment, adaptive filter 104 could generate a FV for a test pixel using a lookup table (LUT) that is indexed by the nE value for the test pixel. FIG. 1 shows an LUT 108 coupled to adaptive filter 104. In one exemplary embodiment, LUT 108 includes a value for each nE indicating the number of times the gray-level value for the test pixel is added to the value nV for determining the FV for the test pixel. In another exemplary embodiment, LUT 108 includes a value for each nE indicating the number of times the calculated result is binary right shifted to generate the FV for the test pixel. In yet another exemplary embodiment, LUT 108 includes a value for each nE indicating whether a particular pixel value from the filter kernel is subtracted from the calculated result to generate the FV for the test pixel.

Still another alternative embodiment provides that adaptive filter 104 selects pixels in predetermined pixel positions in the filtering kernel for generating FV for the test pixel based on a selected criterion, such as when the corresponding map value for a selected pixel equals "1". As still another alternative embodiment, adaptive filter 104 randomly selects pixels from the filtering kernel for calculating FV for a test pixel based on a selected criterion.

In still another embodiment, adaptive filter 104 selects and selectively weights the gray-level values of pixels in the filtering kernel to generate a FV for a test pixel when the corresponding map value of each selected pixel equals "0". For this alternative embodiment, the weighted gray-level values of the selected pixels are summed and averaged. The weighting could be, for example, based on the number of pixels forming the filtering kernel. As an alternative configuration of this embodiment, adaptive filter 104 may add the gray-level value of the test pixel to the summed and averaged selected weighted gray-level values.

The output FV of de-ringing filter stage 101 can be used directly when de-ringing filter stage 101 provides sufficient filtering to remove ringing artifacts from image information. Although the exemplary 3×3 pixel filtering kernel used by adaptive filter 104 is effective in many situations, such a filtering kernel size may be too small when the image information is noisy, contains severe MPEG coding artifacts and/or when a relatively low threshold value for $T_1$ is used. Consequently, the present invention provides that nonlinear low-pass filter (NLPF) stage 102 can be selectively used to provide additional filtering that removes additional coding artifacts, including ringing and blocking. Alternatively, NLPF stage 102 can be used without the filtering provided by de-ringing filter stage 101. As yet another alternative, determination unit 103 and adaptive filter 104 of de-ringing filter stage 101 can be used on the output of NLPF stage 102. As still another alternative, adaptive filter 104 of de-ringing filter stage 101 can be used on the output of NLPF stage 102.

Figure 8A:
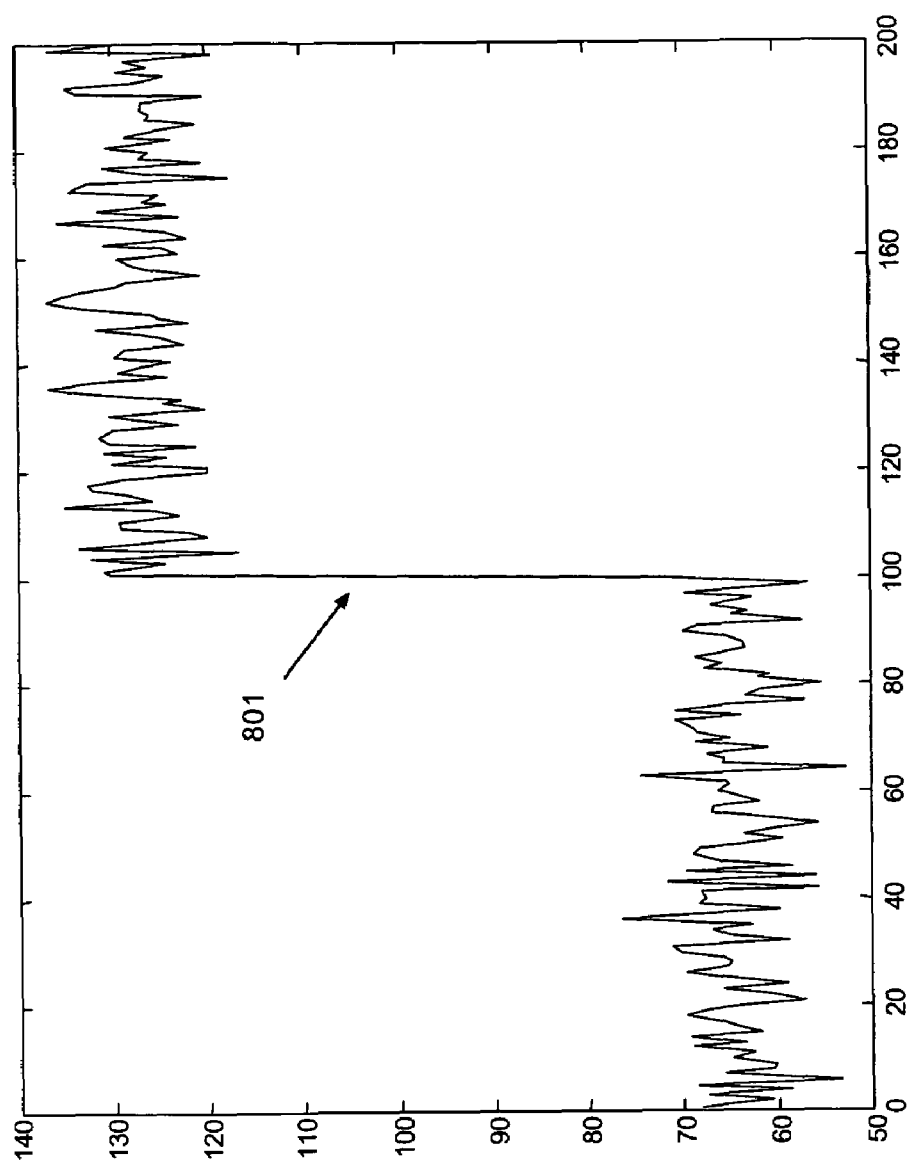
FIGS. 8A-8C depict an exemplary noisy image signal before and after conventional low-pass filtering and nonlinear low-pass filtering according to the present invention.
Figure 8B:
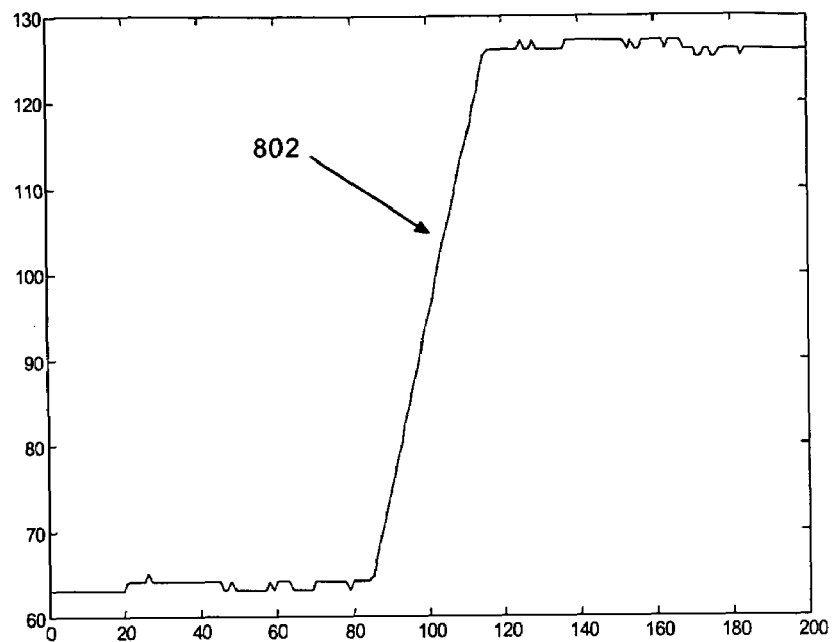
Figure 8C:
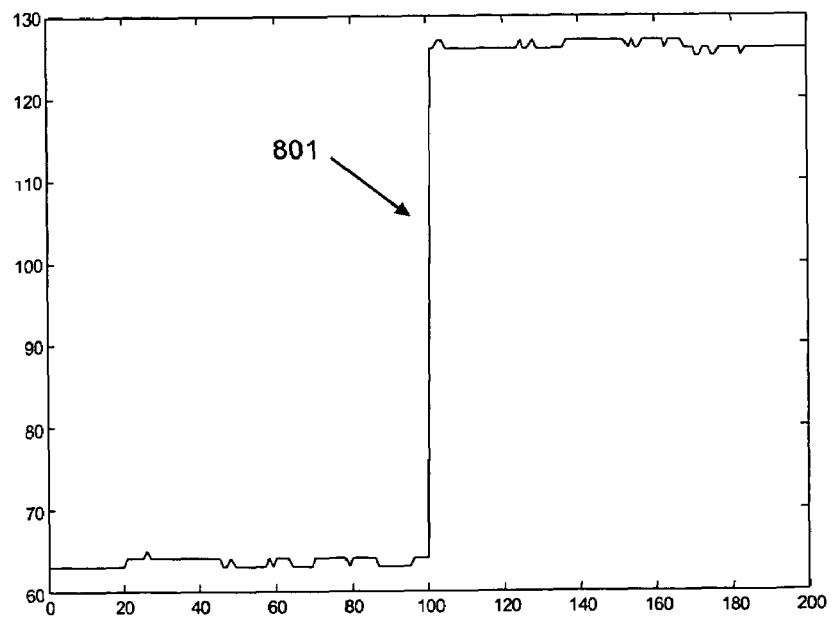

To avoid blurring sharp edges contained in image information, NLPF stage 102 operates as a sieve-type filter by smoothing out the ringing and blocking artifacts, which have small edges, while keeping sharp edges well defined. To illustrate this, consider FIG. 8A, which depicts a portion of an exemplary noisy image signal having a sharp edge 801. FIG. 8B depicts the exemplary noisy signal of FIG. 8A after linear low-pass filtering. As can be observed in FIG. 8B, sharp edge 801 has been blurred, or smoothed, by the linear low-pass filtering by filtering out the high-frequency energy associated with sharp edge 801. FIG. 8C depicts the exemplary noisy signal of FIG. 8A after passing through a NLPF filter stage according to the present invention, such as NLPF stage 102. Sharp edge 801 is retained, while the noisy portions of the signal have been filtered out. In each of FIGS. 8A-8C, the units of the horizontal axis is in samples and the units of the vertical axis is a relative magnitude.

The input to NLPF stage 102 is coupled to the FV output of adaptive filter 104 and to decoded image pixels 107. Both image signals are coupled to NLPF stage 102 because determination unit 103 may not determine that all pixels of an image frame should be filtered. Thus, NLPF stage 102 must have all pixels of an image frame available to remove all coding artifacts, such as ringing and blocking.

Figure 9:
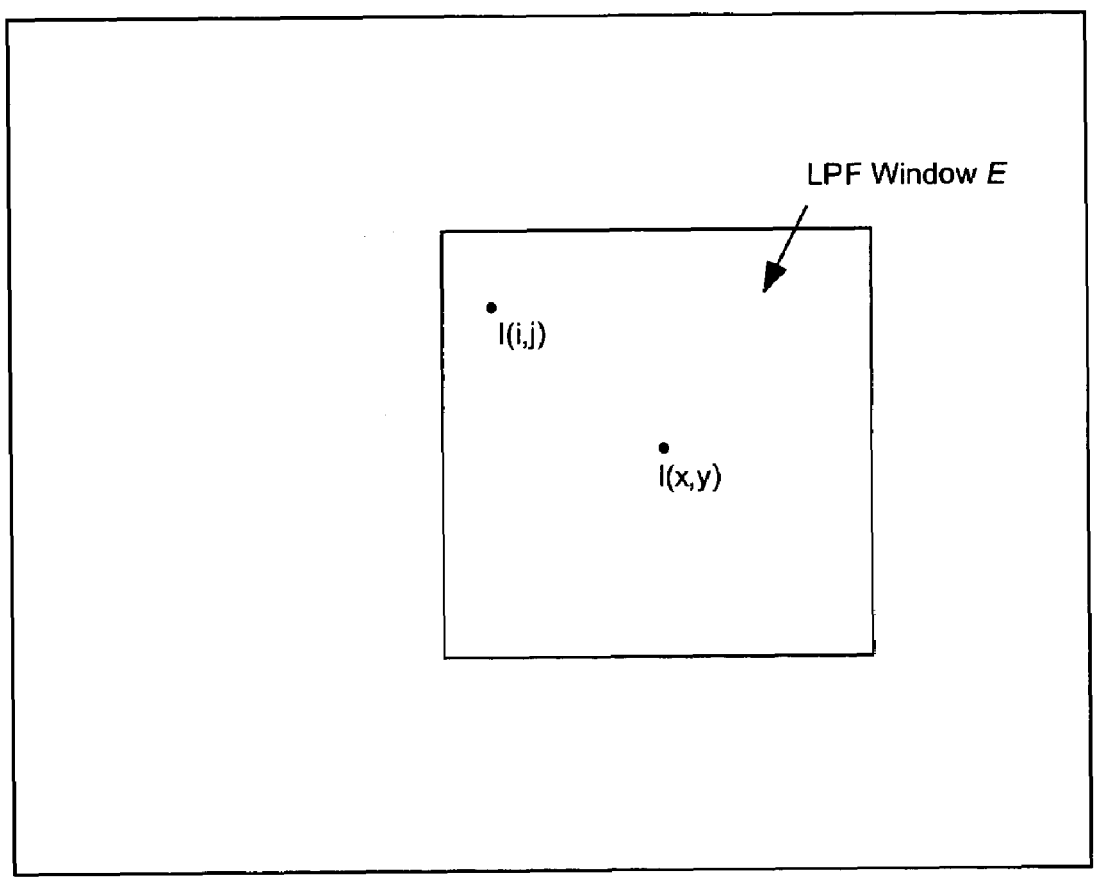
FIG. 9 depicts a representative image in which an exemplary central pixel I(x,y) is at the center of an exemplary LPF window E according to the present invention.

To remove all coding artifacts, NLPF stage 102 uses a one-dimensional or a two-dimensional rectangular window E, in which a test pixel I(x,y) is at the center of a LPF window E, as a linear LPF window. FIG. 9 depicts a representative image 900 in which an exemplary center pixel I(x,y) is at the center of an exemplary LPF window E. NLPF stage 102 calculates the mean gray-level value of the pixels within LPF window E that are not considered to be outlier values. That is, the gray-level values of all of the pixels I(i,j) within LPF window E are compared to the gray-level value of center pixel I(x,y). Only pixels within LPF window E that have an absolute value difference with center pixel I(x,y) that is less than a threshold $T_2$ are averaged. Pixels that have an absolute value difference with center pixel I(x,y) that is greater than threshold $T_2$ are considered to be outliers and are excluded from averaging. Thus, nonlinear LPF stage 102 operates like a sieve to filter out outlier gray-level values.

Figure 10:
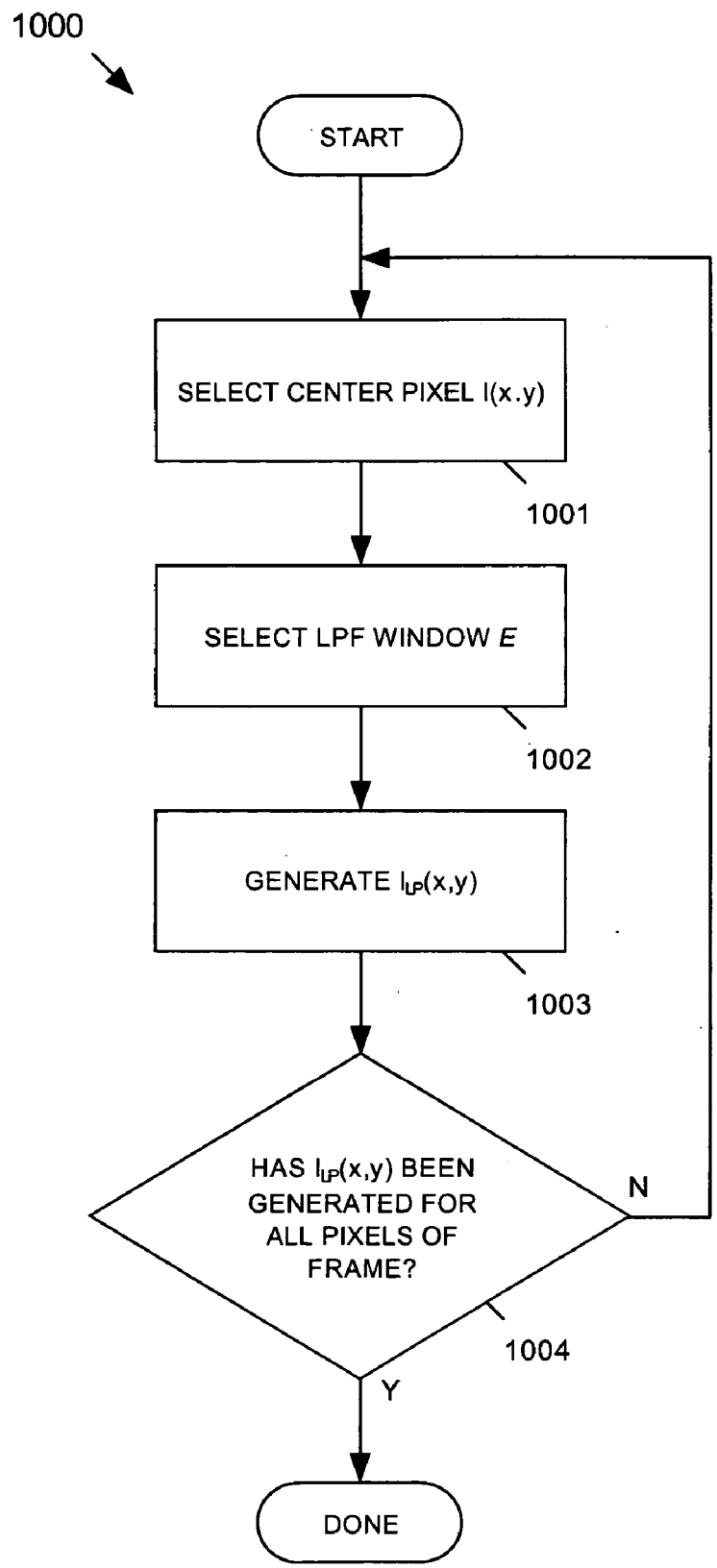
FIG. 10 is a flow diagram of a process for generating a NLPF value for pixels of a frame according to the present invention.

FIG. 10 is a flow diagram of a process 1000 for generating a NLPF value for pixels of a frame according to the present invention. At step 1001, a pixel is selected to be center pixel I(x,y). Flow continues to step 1002 where LPF window E is selected for center pixel I(x,y). The size and shape of LPF window E can vary based on, for example, the location of center pixel I(x, y) within the frame, such as along the edge of the frame or nearer to the center of the frame, or a desired level of filtering. In particular, LPF window E is a one-dimensional or a two-dimensional rectangular window having at least one dimension, and preferably two dimensions, that are greater than three pixels. Possible exemplary sizes, for LPF window E include 17×17, 5×31 or 1×17, in pixels. Alternatively, the size and shape of LPF window E can be such that center pixel I(x, y) is about at the center of LPF window E.

Flow continues to step 1003 where ILP(X,Y) is generated. At step 1004, it is determined whether $I_{LP}$(x,y) has been generated for all pixels of the current frame. If not, flow continues to step 1001 where the next center pixel I(x,y) is selected. If, at step 1004, it is determined that $I_{LP}$(x,y) has been generated for all pixels of the frame, the process ends and prepares for the next frame.

In one exemplary embodiment of step 1003, the output $I_{LP}$(x,y) for center pixel I(x,y) can be mathematically represented by $$I_{LP}(x, y) = \frac{\sum_{(i,j) \in E \& |I(i,j)-I(x,y)| < T_2} I(i, j)}{N(x, y)} \quad (23)$$

in which E is the LPF window, and N(x,y) is the count of the pixels in window E satisfying the condition |I(i,j)−I(x,y)|<$T_2$.

Figure 11:
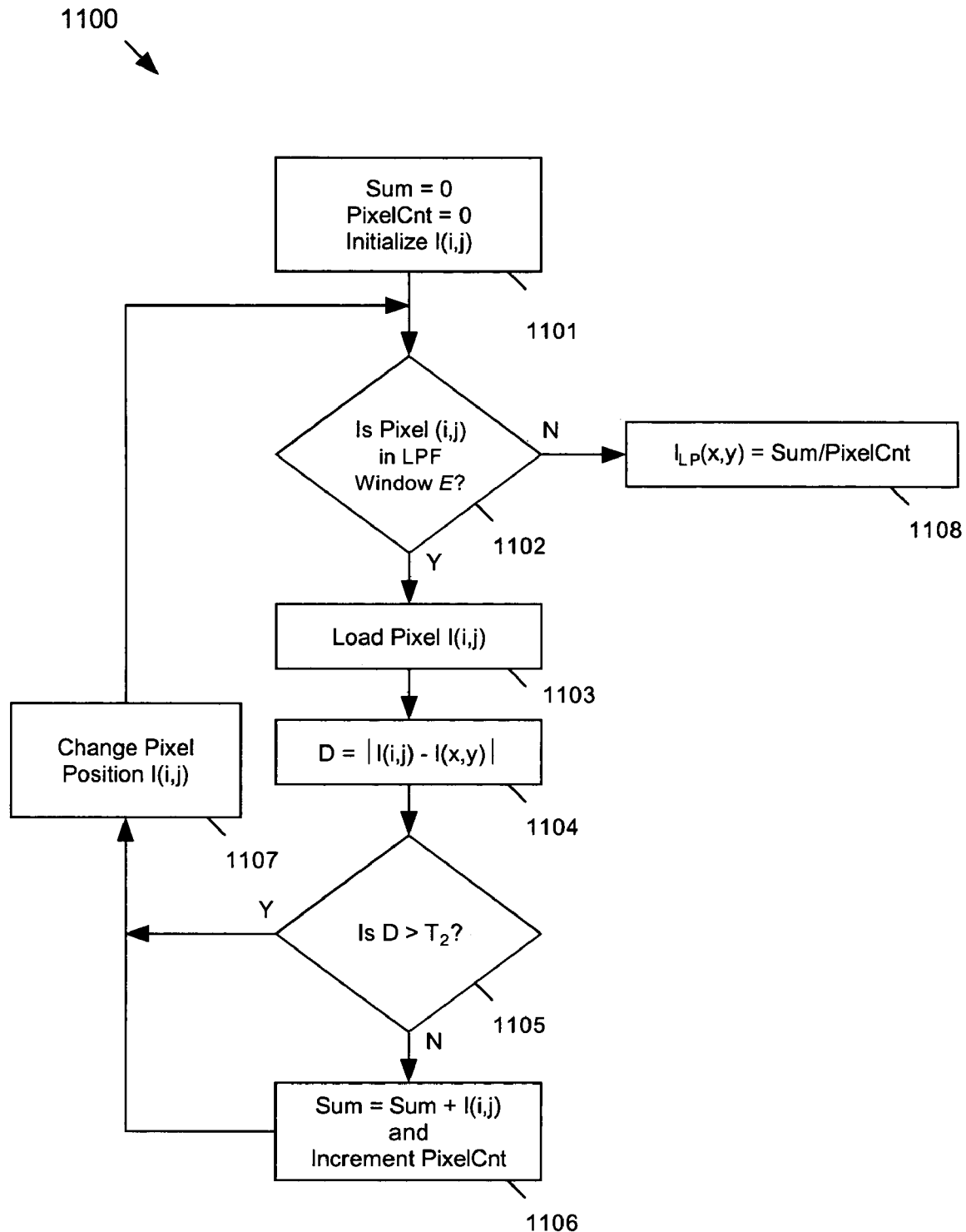
FIG. 11 shows a flow diagram of an exemplary process for generating $I_{LP}(x,y)$ according to the present invention as defined by Eq. 23.

FIG. 11 shows a flow diagram 1100 of an exemplary process for generating $I_{LP}$(x,y) according to the present invention as defined by Eq. 23. At step 1101, the variables Sum and PixelCnt, and the selected pixel I(i,j) are initialized. At step 1102, it is determined whether the selected pixel I(i,j) is within LPF window E. If so, flow continues to step 1103 where the gray-level value of pixel I(i,j) is loaded. Flow continues to step 1104 where the absolute value of the difference between the gray-level value of pixel I(i,j) and center pixel I(x,y) is generated as variable D. Flow continues to step 1105 where it is determined whether D>$T_2$. Threshold $T_2$ can be preset, selectable or learned based on the local information, such as histogram of gray-level values of pixels within LPF window E. If, at step 1105, it is determined that D≦$T_2$, flow continues to step 1106 where the variable Sum equals Sum plus the gray-level value of pixel I(i,j) and the variable PixelCnt is incremented. Flow continues to step 1107 where the next pixel is selected. Flow continues to step 1102.

If, at step 1105, it is determined that D>$T_2$, flow continues directly to step 1107, thereby omitting the pixel under consideration from the averaging process.

If, at step 1102, all pixels have been considered for the current LPF window E, flow continues to step 1108 where the variable Sum is divided by the variable PixelCnt to generate $I_{LP}$(x,y) for center pixel I(x,y).

The process of generating $I_{LP}$(x,y) as defined by Eq. (23) and depicted in FIG. 11 is difficult to implement in hardware. Consequently, the present invention provides an alternative embodiment in which output $I_{LP}$(x,y) for a center pixel I(x,y) is mathematically represented by $$I_{LP}(x, y) = \frac{\sum_{(i,j) \in E \& |I(i,j)-I(x,y)| < T_2} I(i, j) + (N_{total} - N(x, y))I(x, y)}{N_{total}}. \quad (24)$$

When the difference between the gray-level value for a pixel and the gray-level value of the center pixel is greater than threshold $T_2$, instead of omitting the gray-level value of the pixel from summation as is done in Eq. (23), Eq. (24) substitutes the gray-level value of the pixel with the gray-level value of the center pixel in the summation. Eq. (24) has the advantage over Eq. (23) that the denominator of Eq. (24) is fixed, which is preferable by hardware implementation.

Figure 12:
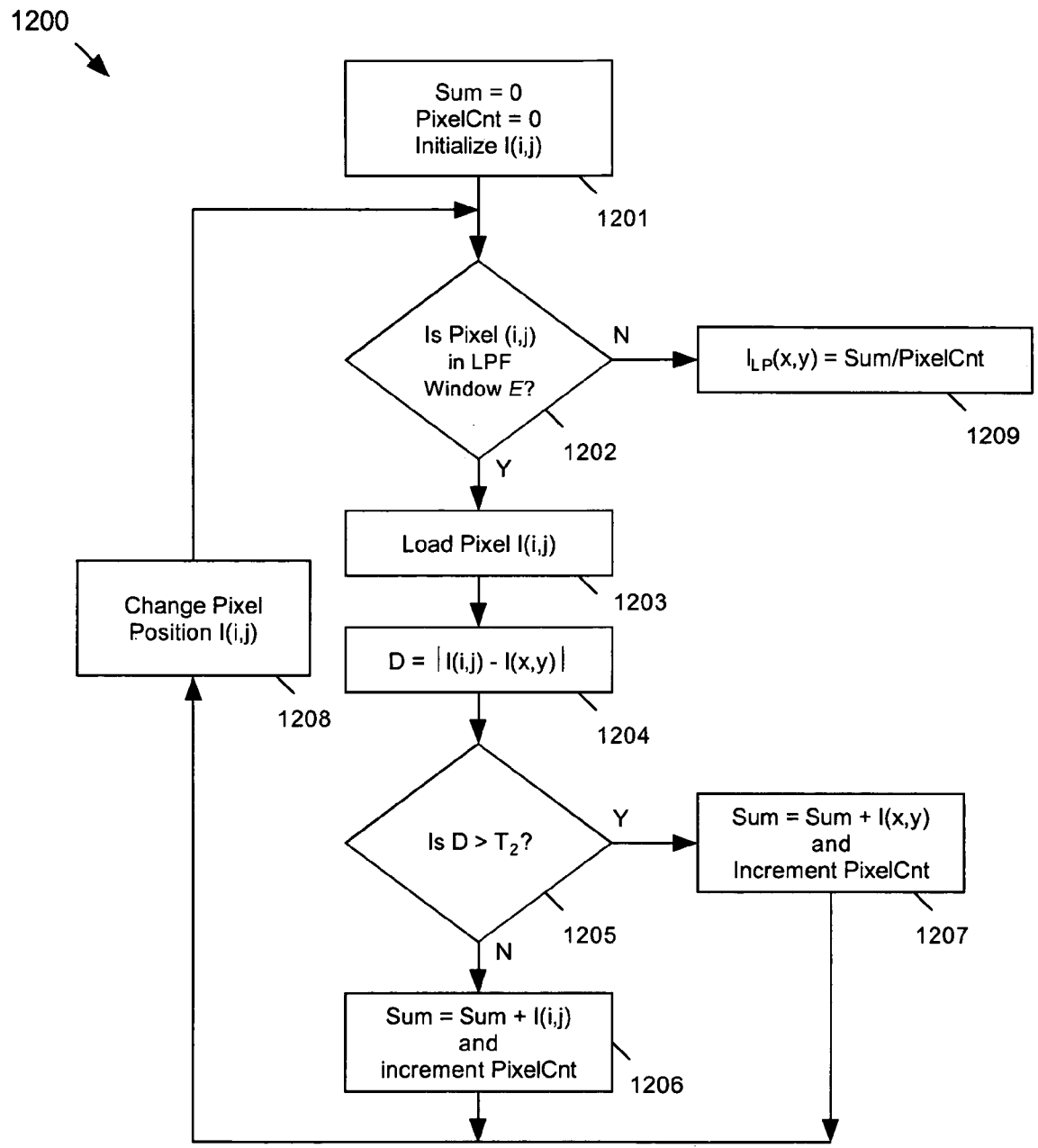
FIG. 12 shows a flow diagram of an exemplary alternative process for generating $I_{LP}(x,y)$ according to the present invention as defined by Eq. 24.

FIG. 12 shows a flow diagram 1200 of an exemplary alternative process for generating $I_{LP}$(x,y) according to the present invention, as defined by Eq. 24. At step 1201, the variables Sum and PixelCnt, and the selected pixel I(i,j) are initialized. At step 1202, it is determined whether the selected pixel I(i,j) is within LPF window E. If so, flow continues to step 1203 where the gray-level value of pixel I(i,j) is loaded. Flow continues to step 1204 where the absolute value of the difference between the gray-level value of pixel I(i,j) and center pixel I(x,y) is generated as variable D. Flow continues to step 1205 where it is determined whether D>$T_2$. As before, threshold $T_2$ can be preset, or learned based on the local information, such as histogram of the window. If, at step 1205, it is determined that D≦$T_2$, flow continues to step 1206 where the variable Sum equals Sum plus the gray-level value of pixel I(i,j) and the variable PixelCnt is incremented. Flow continues to step 1208 where the next pixel is selected. Flow continues to step 1202.

If, at step 1205, it is determined that D>$T_2$, flow continues to step 1207, where the variable Sum equals Sum plus the gray-level value of central pixel I(x,y) and the variable PixelCnt is incremented.

If, at step 1202, all pixels have been considered for the current LPF window E, flow continues to step 1209 where the variable Sum is divided by the variable PixelCnt to generate $I_{LP}$(x,y) for center pixel I(x, y).

Figure 13:
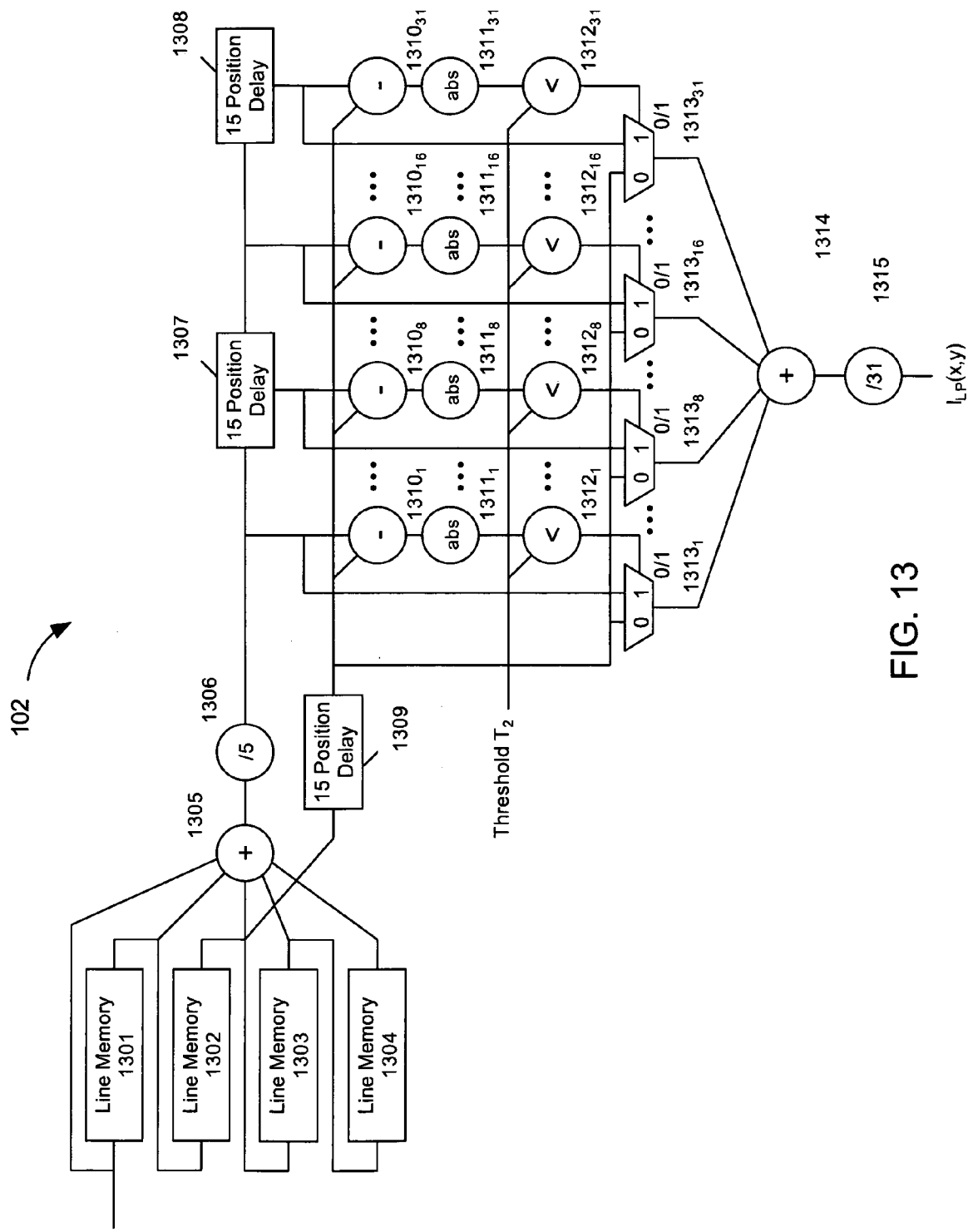
FIG. 13 shows a functional block diagram of an exemplary embodiment of a nonlinear low-pass filter according to the present invention using horizontal 31 taps and vertical 5 taps for a 5×31 pixel LPF window and corresponding to a simplified version of Eq. (24).

FIG. 13 shows a functional block diagram of an exemplary embodiment of NLPF stage 102 according to the present invention using horizontal 31 taps and vertical 5 taps for a 5×31 pixel LPF window E and corresponding to a simplified version of Eq. (24). Because NLPF stage 102 is generally not Cartesian-separable, Eq. (24) is only applied horizontally to simplify the calculation for $I_{LP}$(x,y). That is, the pixels are first averaged vertically and Eq. (24) is then applied to the horizontal 31 averaged data.

NLPF stage 102 includes line memories 1301-1304, a summer 1305, a divider 1306 and three delay circuits 1307-1309. Each line memory 1301-1304 provides storage for one horizontal line of a frame. For example, each line memory is a shift register that is one byte wide by 1048 pixels in length. Line memories 1301-1304 are coupled together in a sequential manner so that line memories 1301-1304 store four sequential lines of image information. Summer 1305 receives data for five lines of a frame, that is, data from the current line and data from the four previous lines, which corresponds to the five-pixel dimension portion of the 5×31 LPF window E. Summer 1305 outputs the sum of the five input lines to divider 1306, which divides the sum by 5 so that the gray-level values of the pixels in a column of five pixels are averaged. The output of divider 1306 is coupled to the input of delay circuit 1307, which can be embodied as a 15-stage shift register. The output of delay circuit 1307 is coupled to the input of delay circuit 1308, which can also be embodied as a 15-stage shift register.

A computational and comparison circuit is coupled to the output of divider 1306 and to each of the 30 stages, or taps, of delay circuits 1307 and 1308. FIG. 13 depicts a computational and comparison circuit only for taps 1, 8, 16 and 31. Each computational and comparison circuit includes a subtractor, an absolute value circuit, a comparator and a multiplexer. In particular, the computational and comparison circuit coupled to the output of divider 1306 includes a subtractor 1310$_1$, an absolute value circuit 1311$_1$, a comparator 1312$_1$ and a multiplexer 1313$_1$. Each subtractor 1310 generates the difference between the gray-level value of the pixel input to subtractor 1310 from delay circuits 1307 and 1308, and the gray-level of the center pixel output from delay circuit 1309. Absolute value circuit 1311 generates the absolute value of the difference output from subtractor 1310. The output of absolute value circuit 11311 is compared to threshold $T_2$ by comparator 1312. The output of comparator 1312 controls multiplexer 1313 to select the gray-level value of the pixel input to subtractor 1310 or the gray-level value of center pixel $I(x,y)$. The gray-level value of the pixel input to subtractor 1310 is selected when the output of absolute value circuit 1311 is greater than threshold $T_2$. When the output of absolute value circuit 1311 is less than or equal to threshold $T_2$, the gray-level value of center pixel $I(x,y)$ is selected.

The respective outputs of multiplexers 1313$_1$-1313$_{31}$ are summed by summer 1314. The output of summer 1314 is divided by divider 1315 to generate $I_{LP}(x,y)$.

NLFP stage 102 can also be a spatially varying NLFP. Additionally, while NLFP stage 102 may be embodied by a plurality of different filters, it is preferable to use a single filter, which is more computationally efficient in many cases. The accumulation of local special activity may be determined in a suitable manner, such as for example, a single sigma type filter or a single sum of absolute differences ("SAD") type filter.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An image de-ringing filter, comprising:
    a determination unit determining whether each selected pixel of a first set of selected pixels of an image contains a ringing artifact based on at least one selected characteristic of selected pixels within a determination kernel of pixels relating to the selected pixel,
    wherein at least one selected characteristic is a gray-level value, and
    an adaptive filter generating a filtered value for each pixel determined by the determination unit to contain a ringing artifact.

2. An image de-ringing filter, comprising:
    a determination unit determining whether each selected pixel of a first set of selected pixels of an image contains a ringing artifact based on at least one selected characteristic of selected pixels within a determination kernel of pixels relating to the selected pixel,
    wherein at least one selected characteristic is a color space value, and
    an adaptive filter generating a filtered value for each pixel determined by the determination unit to contain a ringing artifact.

3. An image de-ringing filter, comprising:
    a determination unit determining whether each selected pixel of a first set of selected pixels of an image contains a ringing artifact based on at least one selected characteristic of selected pixels within a determination kernel of pixels relating to the selected pixel,
    wherein the determination kernel has a non-rectangular shape, and
    an adaptive filter generating a filtered value for each pixel determined by the determination unit to contain a ringing artifact.

4. An image de-ringing filter, comprising:
    a determination unit determining whether each selected pixel of a first set of selected pixels of an image contains a ringing artifact based on at least one selected characteristic of selected pixels within a determination kernel of pixels relating to the selected pixel,
    wherein the selected pixel is located at a center of the determination kernel, and
    wherein the determination unit determines whether a selected pixel contains a ringing artifact further based on a comparison of at least one selected characteristic of pixels on opposite sides of the determination kernel with respect to the selected pixel, and,
    an adaptive filter generating a filtered value for each pixel determined by the determination unit to contain a ringing artifact.

5. An image de-ringing filter, comprising:
    a determination unit determining whether each selected pixel of a first set of selected pixels of an image contains a ringing artifact based on at least one selected characteristic of selected pixels within a determination kernel of pixels relating to the selected pixel,
    wherein the determination kernel includes at least one axis that extends through the selected pixel and bisects determination kernel, and
    wherein the determination unit determines whether a selected pixel contains a ringing artifact further based on a comparison of at least one selected characteristic of pixels on opposite sides of at least one axis bisecting the determination kernel, and
    an adaptive filter generating a filtered value for each pixel determined by the determination unit to contain a ringing artifact.

6. An image de-ringing filter, comprising:
    a determination unit determining whether each selected pixel of a first set of selected pixels of an image contains a ringing artifact, and
    an adaptive filter generating a filtered value for each pixel determined by the determination unit to contain a ringing artifact, wherein the adaptive filter generates a filtered value for each pixel determined to contain a ringing artifact based on at least one selected characteristic of selected pixels within a filtering kernel of pixels relating to the pixel, and wherein at least one selected characteristic is a gray-level value.

7. An image de-ringing filter, comprising:
a determination unit determining whether each selected pixel of a first set of selected pixels of an image contains a ringing artifact, and
an adaptive filter generating a filtered value for each pixel determined by the determination unit to contain a ringing artifact, wherein the adaptive filter generates a filtered value for each pixel determined to contain a ringing artifact based on at least one selected characteristic of selected pixels within a filtering kernel of pixels relating to the pixel, and wherein the filtering kernel has a non-rectangular shape.

8. An image de-ringing filter, comprising:
a determination unit determining whether each selected pixel of a first set of selected pixels of an image contains a ringing artifact, and
an adaptive filter generating a filtered value for each pixel determined by the determination unit to contain a ringing artifact, wherein the adaptive filter generates a filtered value for each pixel determined to contain a ringing artifact based on at least one selected characteristic of selected pixels within a filtering kernel of pixels relating to the pixel, and wherein at least one filtered value generated by the adaptive filter is stored.

9. An image de-ringing filter, comprising:
a determination unit determining whether each selected pixel of a first set of selected pixels of an image contains a ringing artifact, and
an adaptive filter generating a filtered value for each pixel determined by the determination unit to contain a ringing artifact, wherein the adaptive filter generates a filtered value for each pixel determined to contain a ringing artifact based on at least one selected characteristic of selected pixels within a filtering kernel of pixels relating to the pixel, and wherein the adaptive filter generates at least one filtered value based on a value nV that is equal to a sum of selected characteristic values of pixels within the filtering kernel determined to contain a ringing artifact excluding the pixel for which the filtered value is being generated and based on a value nE that is equal to a total number of pixels within the filtering kernel determined to contain a ringing artifact excluding the pixel for which the filtered value is being generated.

10. The image de-ringing filter according to claim 9, wherein the filtering kernel includes eight pixels that neighbor the pixel for which a filtered value (FV) is generated, and wherein when nE=1, FV is calculated as $$FV=(nV+P(i,j)+1)>>1,$$

in which ">>1" represents a binary right-shift operation of 1 bit.

11. The image de-ringing filter according to claim 10, wherein when 1<nE<4, nV is calculated as $$nV=nV+(4-nE)*P(i,j)$$

and FV is calculated as $$FV=(nV+2)>>2,$$

in which ">>2" represents a binary right-shift operation of 2 bits.

12. The image de-ringing filter according to claim 11, wherein when 4≦nE<8, nV is calculated as $$nV=nV+(8-nE)*P(i,j)$$

and FV is calculated as $$FV=(nV+4)>>3,$$

in which ">>3" represents a binary right-shift operation of 3 bits.

13. The image de-ringing filter according to claim 12, wherein when nE=8, nV is calculated as $$nV=nV-P(i+a,j+b)+P(i,j)$$

and FV is calculated as $$FV=(nV+4)>>3,$$

in which a=−1, 0, +1, b=−1, 0, +1, except a and b cannot equal 0 simultaneously; and ">>3" represents a binary right-shift operation of 3 bits.

14. The image de-ringing filter according to claim 9, wherein the filtering kernel includes eight pixels that neighbor the pixel for which a filtered value (FV) is generated, and wherein when nE=1, FV is calculated as $$FV=(nV+P(i,j))>>1,$$

in which ">>1" represents a binary right-shift operation of 1 bit.

15. The image de-ringing filter according to claim 14, wherein when 1<nE<4, nV is calculated as $$nV=nV+(4-nE)*P(i,j)$$

and FV is calculated as $$FV=(nV)>>2,$$

in which ">>2" represents a binary right-shift operation of 2 bits.

16. The image de-ringing filter according to claim 15, wherein when 4≦nE<8, nV is calculated as $$nV=nV+(8-nE)*P(i,j)$$

and FV is calculated as $$FV=(nV)>>3,$$

in which ">>3" represents a binary right-shift operation of 3 bits.

17. The image de-ringing filter according to claim 16, wherein when nE=8, nV is calculated as $$nV=nV-P(i+a,j+b)+P(i,j)$$

and FV is calculated as $$FV=(nV)>>3$$

in which a=−1, 0, +1, b=−1, 0, +1, except a and b cannot equal 0 simultaneously; and ">>3" represents a binary right-shift operation of 3 bits.

18. An image de-ringing filter comprising:
a determination unit determining whether each selected pixel of a first set of selected pixels of an image contains a ringing artifact,
a nonlinear low-pass filter generating a low-pass-filtered value for each selected pixel of a second set of selected pixels of the image, wherein the nonlinear low-pass filter includes,
a low-pass-filter window selector selecting a low-pass-filter window E for each respective selected pixel of the second set of selected pixels of the image; and
a value generator generating the low-pass-filtered value for each respective selected pixel based on the low-pass-filter window E corresponding to the selected pixel, and
an adaptive filter generating a filtered value for each pixel determined by the determination unit to contain a ringing artifact.

19. The image de-ringing filter according to claim 18, wherein the value generator generates the low-pass-filtered value for each respective selected pixel of the second set of selected pixels based on at least one selected characteristic of each pixel within the low-pass-filter window E corresponding to the selected pixel.

20. The image de-ringing filter according to claim 19, wherein at least one low-pass-filter window E is an n×n array of pixels containing the selected pixel.

21. The image de-ringing filter according to claim 19, wherein at least one low-pass-filter window E is an n×m array of pixels containing the selected pixel, and
wherein n does not equal m.

22. The image de-ringing filter according to claim 19, wherein at least one low-pass-filter window E has a shape that is based on a position of the selected pixel in the image.

23. The image de-ringing filter according to claim 19, wherein the low-pass-filter window E has a non-rectangular shape.

24. The image de-ringing filter according to claim 19, wherein at least one selected pixel is located at about a center of the low-pass-filter window E corresponding to the selected pixel.

25. The image de-ringing filter according to claim 19, wherein the low-pass-filtered value generated for each respective selected pixel is based on an average value of at least one selected characteristic of selected pixels within the low-pass-filter window E corresponding to the selected pixel.

26. The image de-ringing filter according to claim 25, wherein a selected characteristic of a pixel within the low-pass-filter window E is used to generate the average value when a difference between the selected characteristic of the pixel and the corresponding characteristic of the selected pixel is less than a predetermined threshold value.

27. The image de-ringing filter according to claim 26, wherein the predetermined threshold value is selectable.

28. The image de-ringing filter according to claim 26, wherein the predetermined threshold value is based on gray-level values of pixels within low-pass-filter window E.

29. The image de-ringing filter according to claim 26, wherein the average value is generated further based on a number of pixels used to generate the average value.

30. The image de-ringing filter according to claim 26, wherein the selected characteristic of the selected pixel is used to generate the average value when a difference between the selected characteristic of a pixel within the low-pass-filter window E and the corresponding characteristic of the selected pixel is less than the predetermined threshold.

31. The image de-ringing filter according to claim 30, wherein the average value is generated further based on a number of pixels in the low-pass-filter window E.

32. The image de-ringing filter according to claim 25, the low-pass-filter window E includes a plurality of columns of pixels and a plurality of rows of pixels
wherein pixels in a column of pixels within the low-pass-filter window E for the selected pixel are averaged to form a row of pixels, each pixel of the row containing an averaged value.

33. The image de-ringing filter according to claim 32, wherein the low-pass-filtered value is based on an average of the averaged values of the row containing averaged values.

34. The image de-ringing filter according to claim 32, wherein a selected characteristic of a pixel within the low-pass-filter window E is used to generate the average gray-level value when a difference between the selected characteristic of a pixel within the row containing averaged values and the corresponding characteristic of the selected pixel is less than a predetermined threshold.

35. The image de-ringing filter according to claim 32, wherein the value of the selected pixel is used to generate the average value when a difference between the selected characteristic of a pixel within the row containing averaged values and the corresponding characteristic of the selected pixel is greater than or equal to a predetermined threshold.

36. An image de-ringing filter, comprising:
a low-pass-filter window selector selecting a low-pass-filter window E for each respective selected pixel of a first set of selected pixels of an image; and
a value generator generating a low-pass-filtered value for each respective selected pixel based on at least one selected characteristic of the pixels contained in the low-pass-filter window E corresponding to the selected pixel, a the selected characteristic of the selected pixel being used to generate an average value when a difference between the selected characteristic of a pixel within the low-pass-filter window E and the corresponding characteristic of the selected pixel is less than a predetermined threshold.

37. The image de-ringing filter according to claim 36, wherein the low-pass-filtered value is a low-pass-filtered gray-level value.

38. The image de-ringing filter according to claim 36, wherein the low-pass-filtered value is a low-pass-filtered color space value.

39. The image de-ringing filter according to claim 36, wherein the average value is generated further based on a number of pixels in the low-pass-filter window E.

40. The image de-ringing filter according to claim 36, wherein at least one low-pass-filter window E is an n×n array of pixels containing the selected pixel.

41. The image de-ringing filter according to claim 36, wherein at least one low-pass-filter window E is an n×m array of pixels containing the selected pixel, and
wherein n does not equal m.

42. The image de-ringing filter according to claim 36, wherein the low-pass-filter window E has a non-rectangular shape.

43. The image de-ringing filter according to claim 36, wherein at least one low-pass-filter window E has a shape that is based on a position of the selected pixel in the image.

44. The image de-ringing filter according to claim 36, wherein at least one selected pixel is located at about a center of the low-pass-filter window E corresponding to the selected pixel.

45. The image de-ringing filter according to claim 36, wherein the predetermined threshold value is selectable.

46. The image de-ringing filter according to claim 36, wherein the predetermined threshold value is based on gray-level values of pixels within low-pass-filter window E.

47. The image de-ringing filter according to claim 36, the low-pass-filter window E includes a plurality of columns of pixels and a plurality of rows of pixels
wherein pixels in a column of pixels within the low-pass-filter window E for the selected pixel are averaged to form a row of pixels, each pixel of the row containing an averaged value.

48. The image de-ringing filter according to claim 36, wherein the low-pass-filtered value is based on an average of the averaged values of the row containing averaged values.

49. The image de-ringing filter according to claim 36, wherein the selected characteristic of the selected pixel is used to generate the average value when a difference between the selected characteristic of a pixel within the row containing averaged gray-level values and the corresponding characteristic of the selected pixel is greater than or equal to a predetermined threshold.

50. The image de-ringing filter according to claim 36, further comprising:
a determination unit determining whether each selected pixel of a second set of selected pixels of an image contains a ringing artifact; and
an adaptive filter generating a filtered value for each pixel determined by the determination unit to contain a ringing artifact.

51. The image de-ringing filter according to claim 50, wherein the determination unit determines whether a selected pixel of the second set of selected pixels contains a ringing artifact based on at least one selected characteristic of selected pixels within a determination kernel of pixels relating to the selected pixel of the second set of selected pixels.

52. The image de-ringing filter according to claim 51, wherein at least one selected characteristic is a gray-level value.

53. The image de-ringing filter according to claim 51, wherein at least one selected characteristic is a color space value.

54. The image de-ringing filter according to claim 50, wherein the first set of selected pixels equals the second set of selected pixels.

55. The image de-ringing filter according to claim 50, wherein the first set of selected pixels is different from the second set of selected pixels.

56. The image de-ringing filter according to claim 50, wherein the adaptive filter generates a filtered value for each pixel determined to contain a ringing artifact based on at least one selected characteristic of selected pixels within a filtering kernel of pixels relating to the pixel.

57. A method of removing ringing artifacts from an image, the method comprising:
determining whether each selected pixel of a first set of selected pixels of an image contains a ringing artifact based on at least one selected characteristic of selected pixels within a determination kernel of pixels relating to the selected pixel;
generating a filtered value for each pixel determined to contain a ringing artifact; and
generating a low-pass-filtered value for each selected pixel of a second set of selected pixels of the image, wherein generating a low-pass-filtered value includes,
selecting a low-pass-filter window E for each respective selected pixel of the second set of selected pixels of the image; and
generating the low-pass-filtered value for each respective selected pixel based on the low-pass-filter window E corresponding to the selected pixel.

58. The method according to claim 57, wherein the low-pass-filtered value is a low-pass-filtered gray-level value.

59. The method according to claim 57, wherein the low-pass-filtered value is a low-pass-filtered color space value.

60. The method according to claim 57, wherein generating the low-pass-filtered value for each respective selected pixel is based on an average value of at least one selected characteristic of selected pixels within the low-pass-filter window E corresponding to the selected pixel.

61. The method according to claim 60, wherein generating the average value uses a at least one selected characteristic of a pixel within the low-pass-filter window E when a difference between the selected characteristic of the pixel and the corresponding characteristic of the selected pixel is less than a predetermined threshold value.

62. The method according to claim 61, wherein the predetermined threshold value is selectable.

63. The method according to claim 61, wherein generating the average value using the selected characteristic of the selected pixel when a difference between the selected characteristic of a pixel within the low-pass-filter window E and the corresponding characteristic of the selected pixel is greater than or equal to the predetermined threshold.

64. A method of removing ringing artifacts from an image, the method comprising:
selecting a low-pass-filter window E for each respective selected pixel of a first set of selected pixels of an image; and
generating a low-pass-filtered value for each respective selected pixel based on at least one selected characteristic of the pixels contained in the low-pass-filter window E corresponding to the selected pixel, a selected characteristic of the selected pixel being used to generate the average value when a difference between the selected characteristic of a pixel within the low-pass-filter window E and the corresponding characteristic of the selected pixel is greater than or equal to a predetermined threshold.

65. The method according to claim 64, wherein the low-pass-filtered value is a low-pass-filtered gray-level value.

66. The method according to claim 65, wherein the low-pass-filtered value is a low-pass-filtered color space value.

67. The method according to claim 65, wherein at least one low-pass-filter window E has a shape that is based on a position of the selected pixel in the image.

68. The method according to claim 65, wherein at least one selected pixel is located at about a center of the low-pass-filter window E corresponding to the selected pixel.

69. The method according to claim 65, wherein the predetermined threshold value is selectable.

70. The method according to claim 65, further comprising:
determining whether each selected pixel of a second set of selected pixels of an image contains a ringing artifact; and
generating a filtered value for each pixel determined to contain a ringing artifact.

71. The method according to claim 70, wherein at least one selected characteristic is a gray-level value.

72. The method according to claim 70, wherein at least one selected characteristic is a color space value.

73. The method according to claim 62, wherein determining whether a selected pixel of the second set of selected pixels contains a ringing artifact is based on at least one selected characteristic of selected pixels within a determination kernel of pixels relating to the selected pixel of the second set of selected pixels.

74. The method according to claim 64, generating a filtered value for each pixel determined to contain a ringing artifact is based on at least one selected characteristic of selected pixels within a filtering kernel of pixels relating to the pixel.

* * * * *